(12) United States Patent
Elsherif et al.

(10) Patent No.: US 12,395,864 B2
(45) Date of Patent: Aug. 19, 2025

(54) CONFIGURATION SWITCH TRIGGERS FOR AUDIO DEVICE COMMUNICATIONS

(71) Applicant: QUALCOMM Incorporated, San Diego, CA (US)

(72) Inventors: Ahmed Ragab Elsherif, San Jose, CA (US); Benjamin James Campbell, Bury St Edmunds (GB); Derrick Chu Lin, Hillsborough, CA (US); Laurent Wojcieszak, Belfast (GB); Srikant Kuppa, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 18/309,690

(22) Filed: Apr. 28, 2023

(65) Prior Publication Data

US 2024/0114357 A1    Apr. 4, 2024

Related U.S. Application Data

(60) Provisional application No. 63/378,340, filed on Oct. 4, 2022.

(51) Int. Cl.
*H04W 24/10*    (2009.01)
*H04W 24/02*    (2009.01)

(52) U.S. Cl.
CPC ........... *H04W 24/02* (2013.01); *H04W 24/10* (2013.01)

(58) Field of Classification Search
CPC .............................. H04W 24/02; H04W 24/10
See application file for complete search history.

(56) References Cited

U.S. PATENT DOCUMENTS

| | | | |
|---|---|---|---|
| 2014/0169212 A1 | 6/2014 | Villasenor | |
| 2016/0345341 A1* | 11/2016 | Oliver | ................... H04W 4/027 |
| 2020/0107174 A1 | 4/2020 | Tong et al. | |
| 2021/0266808 A1 | 8/2021 | Avadhanam et al. | |

(Continued)

FOREIGN PATENT DOCUMENTS

| | | |
|---|---|---|
| EP | 3920565 A1 | 12/2021 |
| WO | WO-2009099904 | 8/2009 |
| WO | 2022186929 | 9/2022 |

OTHER PUBLICATIONS

International Search Report and Written Opinion—PCT/US2023/073759—ISA/EPO—Dec. 22, 2023.

(Continued)

*Primary Examiner* — Chuong A Ngo
(74) *Attorney, Agent, or Firm* — Harrity & Harrity, LLP

(57) ABSTRACT

Various aspects of the present disclosure generally relate to wireless communication. In some aspects, a wireless communication device (WCD) may communicate, via a wireless link, with an audio device using a first configuration having first values for communication parameters. The WCD may transmit an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters associated with a reduction in voltage-induced interference in an audio output of the audio device. Numerous other aspects are described.

30 Claims, 10 Drawing Sheets

(56) References Cited

U.S. PATENT DOCUMENTS

2021/0352766 A1    11/2021  Srivastava et al.
2021/0409324 A1*  12/2021  Byrne ..................... H04L 45/70

OTHER PUBLICATIONS

Selvaradjou K., et al., "Optimization of Bluetooth Audio Stream based on the Estimation of Proximity", International Journal of Computer and Electrical Engineering, vol. 2, No. 3, Jun. 2010, pp. 550-554.

* cited by examiner ical devices. For example, wireless devices such as cellular phones may utilize WPAN communications to exchange information such as audio signals with wireless headsets.

CONFIGURATION SWITCH TRIGGERS FOR AUDIO DEVICE COMMUNICATIONS

CROSS-REFERENCE TO RELATED APPLICATION

This patent application claims priority to Provisional Patent Application No. 63/378,340, filed on Oct. 4, 2022 entitled "CONFIGURATION SWITCH TRIGGERS FOR AUDIO DEVICE COMMUNICATIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configuration switch triggers for audio device communications.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network, may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. "Downlink" may refer to the communication link from the AP to the station, and "uplink" may refer to the communication link from the station to the AP.

The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (WPAN), which may include a Bluetooth connection, may provide for short range wireless connections between two or more paired wireless devices. For example, wireless devices such as cellular phones may utilize WPAN communications to exchange information such as audio signals with wireless headsets.

SUMMARY

Some aspects described herein relate to a method of wireless communication performed by a wireless communication device (WCD). The method may include communicating, via a wireless link, with an audio device using a first configuration having first values for communication parameters, the communication parameters including one or more of: a periodicity of uplink traffic, a periodicity of downlink traffic, an uplink transmission power, or a modulation and coding scheme (MCS). The method may include transmitting an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters (e.g., where at least one of the second values for a communication parameter being different from the first value for the corresponding communication parameter).

Some aspects described herein relate to a method of wireless communication performed by an audio device. The method may include communicating, via a wireless link, with a WCD using a first configuration having first values for communication parameters, the communication parameters including one or more of: a periodicity of uplink traffic, a periodicity of downlink traffic, an uplink transmission power, or an MCS. The method may include receiving an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters (e.g., where at least one of the second values for a communication parameter being different from the first value for the corresponding communication parameter).

Some aspects described herein relate to a WCD for wireless communication. The wireless communication device may include a memory and one or more processors coupled to the memory. The one or more processors may be configured to communicate, via a wireless link, with an audio device using a first configuration having first values for communication parameters, the communication parameters including one or more of: a periodicity of uplink traffic, a periodicity of downlink traffic, an uplink transmission power, or an MCS. The one or more processors may be configured to transmit an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters (e.g., where at least one of the second values for a communication parameter being different from the first value for the corresponding communication parameter).

Some aspects described herein relate to an audio device for wireless communication. The audio device may include a memory and one or more processors coupled to the memory. The one or more processors may be configured to communicate, via a wireless link, with a WCD using a first configuration having first values for communication parameters, the communication parameters including one or more of: a periodicity of uplink traffic, a periodicity of downlink traffic, an uplink transmission power, or an MCS. The one or more processors may be configured to receive an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters (e.g., where at least one of the second values for a communication parameter being different from the first value for the corresponding communication parameter).

Some aspects described herein relate to a non-transitory computer-readable medium that stores a set of instructions for wireless communication by a WCD. The set of instructions, when executed by one or more processors of the WCD, may cause the WCD to communicate, via a wireless link, with an audio device using a first configuration having first values for communication parameters, the communication parameters including one or more of: a periodicity of uplink traffic, a periodicity of downlink traffic, an uplink transmission power, or an MCS. The set of instructions, when executed by one or more processors of the WCD, may cause the WCD to transmit an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters (e.g., where at least one of the second values for a communication parameter being different from the first value for the corresponding communication parameter).

Some aspects described herein relate to a non-transitory computer-readable medium that stores a set of instructions for wireless communication by an audio device. The set of instructions, when executed by one or more processors of the audio device, may cause the audio device to communicate, via a wireless link, with a WCD using a first configuration having first values for communication parameters, the communication parameters including one or more of: a periodicity of uplink traffic, a periodicity of downlink traffic, an uplink transmission power, or an MCS. The set of instructions, when executed by one or more processors of the audio device, may cause the audio device to receive an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters (e.g., where at least one of the second values for a communication parameter being different from the first value for the corresponding communication parameter).

Some aspects described herein relate to an apparatus for wireless communication. The apparatus may include means for communicating, via a wireless link, with an audio device using a first configuration having first values for communication parameters, the communication parameters including one or more of: a periodicity of uplink traffic, a periodicity of downlink traffic, an uplink transmission power, or an MCS. The apparatus may include means for transmitting an indication to switch to a second configuration based at least in part on a configuration switch trigger, the configuration switch trigger being based at least in part on one or more of a link quality metric associated with the wireless link or a change of a use state of the apparatus, and the second configuration having second values for the communication parameters (e.g., where at least one of the second values for a communication parameter being different from the first value for the corresponding communication parameter).

Some aspects described herein relate to an apparatus for wireless communication. The apparatus may include means for communicating, via a wireless link, with a WCD using a first configuration having first values for communication parameters, the communication parameters including one or more of: a periodicity of uplink traffic, a periodicity of downlink traffic, an uplink transmission power, or an MCS. The apparatus may include means for receiving an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters (e.g., where at least one of the second values for a communication parameter being different from the first value for the corresponding communication parameter).

Aspects generally include a method, apparatus, system, computer program product, non-transitory computer-readable medium, user equipment, base station, network entity, network node, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
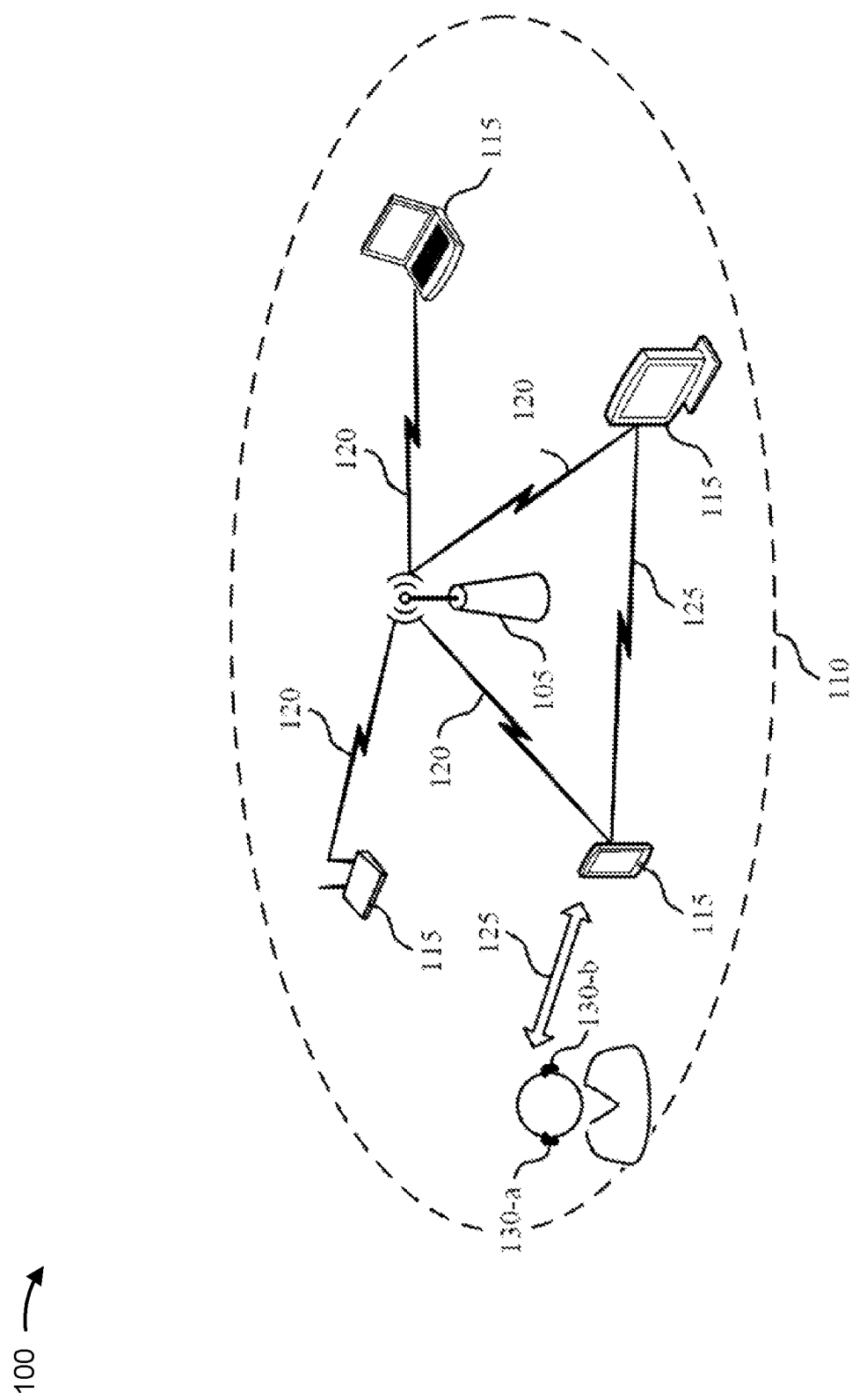
FIG. 1 illustrates a wireless communication system (also known as a wireless local area network (WLAN) or a Wi-Fi network) configured, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

In some networks, a wireless communication device (WCD) may support applications associated with low-latency or lossless audio to one or more other devices, such as one or more personal audio devices. For example, a wireless communication device may support applications and use cases associated with ultra-low-latency (ULL), such as ULL gaming, or streaming lossless audio to one or more personal audio devices (e.g., peripheral devices) of a user. In scenarios in which a user uses two peripheral devices, the wireless communication device may support an extended personal audio network (XPAN) via which the wireless communication device may communicate with the two peripheral devices. To meet latency or lossless criteria associated with an application or use case, XPAN devices may employ a target wake time (TWT) technique for communication between the wireless communication device and the peripheral devices. In some systems, the peripheral devices and the wireless communication device may exchange one or more Bluetooth messages and implement a complete TWT teardown between the wireless communication device and each of the peripheral devices. Such an exchange of Bluetooth messages and TWT teardown may introduce too much latency for some applications, such as ULL gaming or streaming lossless audio applications.

In some implementations, a WCD, which may be a handset or an access point (AP) (e.g., a soft AP (SAP)), and a set of peripheral devices (e.g., earbuds or audio devices) may use downlink audio data packets to carry updated TWT parameters or any other XPAN-related parameters that the wireless communication device and the peripheral devices may indicate via wireless signaling. Additionally, or alternatively, the wireless communication device may embed a set of updated parameters in a padding section of an audio data packet and may transmit the audio data packet to the peripheral devices. The peripheral devices may each acknowledge the audio data packet transmitted by the wireless communication device, and the wireless communication device may communicate in accordance with the updated parameters based on receiving acknowledgements from each of the peripheral devices.

FIG. 1 illustrates a wireless communication system 100 (also known as a wireless local area network (WLAN) or a Wi-Fi network) configured in accordance with the present disclosure. The wireless communication system 100 may include an AP 105 and multiple associated devices 115 (such as stations (STAs) or SAPs), which may represent devices such as mobile stations, personal digital assistants (PDAs), other handheld devices, netbooks, notebook computers, tablet computers, laptops, display devices (e.g., TVs, computer monitors, etc.), printers, etc. The AP 105 and the associated devices 115 (e.g., associated STAs) may represent a basic service set (BSS) or an extended service set (ESS). The various devices 115 in the network are able to communicate with one another through the AP 105. Also shown is a coverage area 110 of the AP 105, which may represent a basic service area (BSA) of the wireless communication system 100. An extended network station (not shown) associated with the wireless communication system 100 may be connected to a wired or wireless distribution system that may allow multiple APs 105 to be connected in an ESS.

Although not shown in FIG. 1, a device 115 may be located in the intersection of more than one coverage area 110 and may associate with more than one AP 105. A single AP 105 and an associated set of devices 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The wireless communication system 100 may include APs 105 of different types (e.g., metropolitan area, home network, etc.), with varying and overlapping coverage areas 110. Two devices 115 may also communicate directly via a direct wireless communication link 125 regardless of whether both devices 115 are in the same coverage area 110. Examples of direct wireless communication links 120 may include Wi-Fi Direct connections, Wi-Fi Tunneled Direct Link Setup (TDLS) links, and other group connections. Devices 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communication system 100.

In some cases, a device 115 (or an AP 105) may be detectable by a central AP 105, but not by other devices 115 in the coverage area 110 of the central AP 105. For example, one device 115 may be at one end of the coverage area 110 of the central AP 105 while another device 115 may be at the other end. Thus, both devices 115 may communicate with the AP 105, but may not receive the transmissions of the other. This may result in colliding transmissions for the two devices 115 in a contention-based environment (e.g., carrier sense multiple access with collision avoidance (CSMA/CA)) because the devices 115 may not refrain from transmitting on top of each other. A device 115 whose transmissions are not identifiable, but that is within the same coverage area 110 may be known as a hidden node. CSMA/CA may be supplemented by the exchange of a request-to-send (RTS) packet transmitted by a sending device 115 (or AP 105) and a clear-to-send (CTS) packet transmitted by the receiving device 115 (or AP 105). This may alert other devices within range of the sender and receiver not to transmit for the duration of the primary transmission. Thus, RTS and/or CTS may help mitigate a hidden node problem.

The wireless communication system 100 may include an AP 105, devices 115 (e.g., which may be referred to as source devices or central devices), and paired devices 115 (e.g., which may be referred to as sink devices or peripheral devices) implementing WLAN communications (e.g., Wi-Fi communications) and/or Bluetooth communications. For example, devices 115 may include cell phones, user equipment (UEs), STAB, mobile stations, PDAs, other handheld devices, netbooks, notebook computers, tablet computers, laptops, or some other suitable terminology. Paired devices 115 may include Bluetooth-enabled devices capable of pairing with other Bluetooth-enabled devices (e.g., such as devices 115), which may include wireless audio devices (e.g., headsets, earbuds, speakers, earpieces, headphones), display devices (e.g., TVs, computer monitors), microphones, meters, valves, etc.

"Bluetooth communications" may refer to a short-range communication protocol and may be used to connect and exchange information between devices 115 and paired devices 115 (e.g., between mobile phones, computers, digital cameras, wireless headsets, speakers, keyboards, mice or other input peripherals, and similar devices). Bluetooth systems (e.g., aspects of wireless communication system 100) may be organized using a central-peripheral relationship employing a time-division duplex protocol having, for example, defined time slots of 625 microseconds, in which transmission alternates between the central device (e.g., a device 115) and one or more peripheral devices (e.g., paired devices 115). In some examples, "device 115" may generally refer to a central device, and "paired device 115" may refer to a peripheral device in the wireless communication system 100. Therefore, in some examples, a device may be referred to as either a device 115 or a paired device 115 based on the Bluetooth role configuration of the device. That is, designation of a device as either a device 115 or a paired device 115 may not necessarily indicate a distinction in device capability, but rather may refer to or indicate roles held by the device in the wireless communication system 100. Generally, "device 115" may refer to a wireless communication device capable of wirelessly exchanging data signals with another device (e.g., a paired device 115), and "paired device 115" may refer to a device operating in a peripheral role, or to a short-range wireless communication device capable of exchanging data signals with the device 115 (e.g., using Bluetooth communication protocols).

A communication link 125 may be established between two Bluetooth-enabled devices (e.g., between a device 115 and a paired device 115) and may provide for communications or services (e.g., according to some Bluetooth profiles). The controller stack may be responsible for setting up communication links 125, such as asynchronous connection-oriented links (or asynchronous connection-oriented connections), synchronous connection-orientated (SCO) links (or SCO connections), extended synchronous connection-oriented (eSCO) links (or eSCO connections), other logical transport channel links, etc. For example, a Bluetooth connection may be an eSCO connection for voice calls (e.g., which may allow for retransmission), an asynchronous connection-less (ACL) connection for music streaming (e.g., advanced audio distribution profile (A2DP)), etc. eSCO packets may be transmitted in predetermined time slots (e.g., 6 Bluetooth slots each for eSCO). The regular interval between the eSCO packets may be specified when the Bluetooth link is established. The eSCO packets to/from a specific device (e.g., paired device 115) are acknowledged and may be retransmitted if not acknowledged during a retransmission window. In addition, audio may be streamed between a device 115 and a paired device 115 using an ACL connection (e.g., an A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (e.g., providing considerably reduced power consumption and cost while maintaining a similar communication range), human interface device (HID) profile (e.g., providing low latency links with low power requirements), etc.

A device may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 115 may support WLAN communications via AP 105 (e.g., over communication links 120). The AP 105 and the associated devices 115 may represent a BSS or an ESS. The various devices 115 in the network may be able to communicate with one another through the AP 105. In some cases the AP 105 may be associated with a coverage area, which may represent a BSA.

Devices 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100, and devices may communicate with each other via communication links 120 (e.g., Wi-Fi Direct connections, Wi-Fi TDLS links, peer-to-peer communication links, or other peer or group connections). AP 105 may be coupled to a network (such as the Internet) and may enable a device 115 to communicate via the network (or communicate with other devices 115 coupled to the AP 105). A device 115 may communicate with a network device bi-directionally. For example, in a WLAN, a device 115 may communicate with an associated AP 105 via downlink (e.g., the communication link from the AP 105 to the device 115) and uplink (e.g., the communication link from the device 115 to the AP 105).

In some examples, content, media, audio, etc. exchanged between a device 115 and a paired device 115 may originate from a WLAN. For example, in some examples, device 115 may receive audio from an AP 105 (e.g., via WLAN communications), and the device 115 may then relay or pass the audio to the paired device 115 (e.g., via Bluetooth communications). In some examples, certain types of Bluetooth communications (e.g., such as high quality or high definition (HD) Bluetooth) may require enhanced quality of service. For example, in some examples, delay-sensitive Bluetooth traffic may have a higher priority than WLAN traffic.

In some deployments, a wireless communication device may support applications associated with low-latency or lossless audio to one or more other devices, such as one or more personal audio devices. For example, a wireless communication device may support applications and use cases associated with ULL, such as ULL gaming, or streaming lossless audio to one or more personal audio devices (e.g., peripheral devices) of a user. In scenarios in which a user uses two peripheral devices (e.g., a wireless earbud 130-a and a wireless earbud 130-b), the wireless communication device may support an XPAN via which the wireless communication device may communicate with the two peripheral devices.

To meet latency or lossless criteria associated with an application or use case, XPAN devices may employ a TWT technique for communication between the wireless communication device and the peripheral devices. Initial or default TWT parameters may be set under an expectation for ideal (e.g., interference-free or approximately interference-free) conditions and may be updated in response to changing channel conditions or a changing concurrency situation at the wireless communication device. In some systems, the peripheral devices and the wireless communication device may exchange one or more Bluetooth messages and implement a complete TWT teardown between the wireless communication device and each of the peripheral devices. Such an exchange of Bluetooth messages and TWT teardown may introduce too much latency for some applications, such as ULL gaming or streaming lossless audio applications.

In some implementations, a wireless communication device, which may be a device 115 (e.g., a handset) or an AP 105, and a set of peripheral devices may use downlink audio data packets to carry updated TWT parameters or any other XPAN-related parameters that the wireless communication device and the peripheral devices may indicate via wireless signaling.

Figure 2:
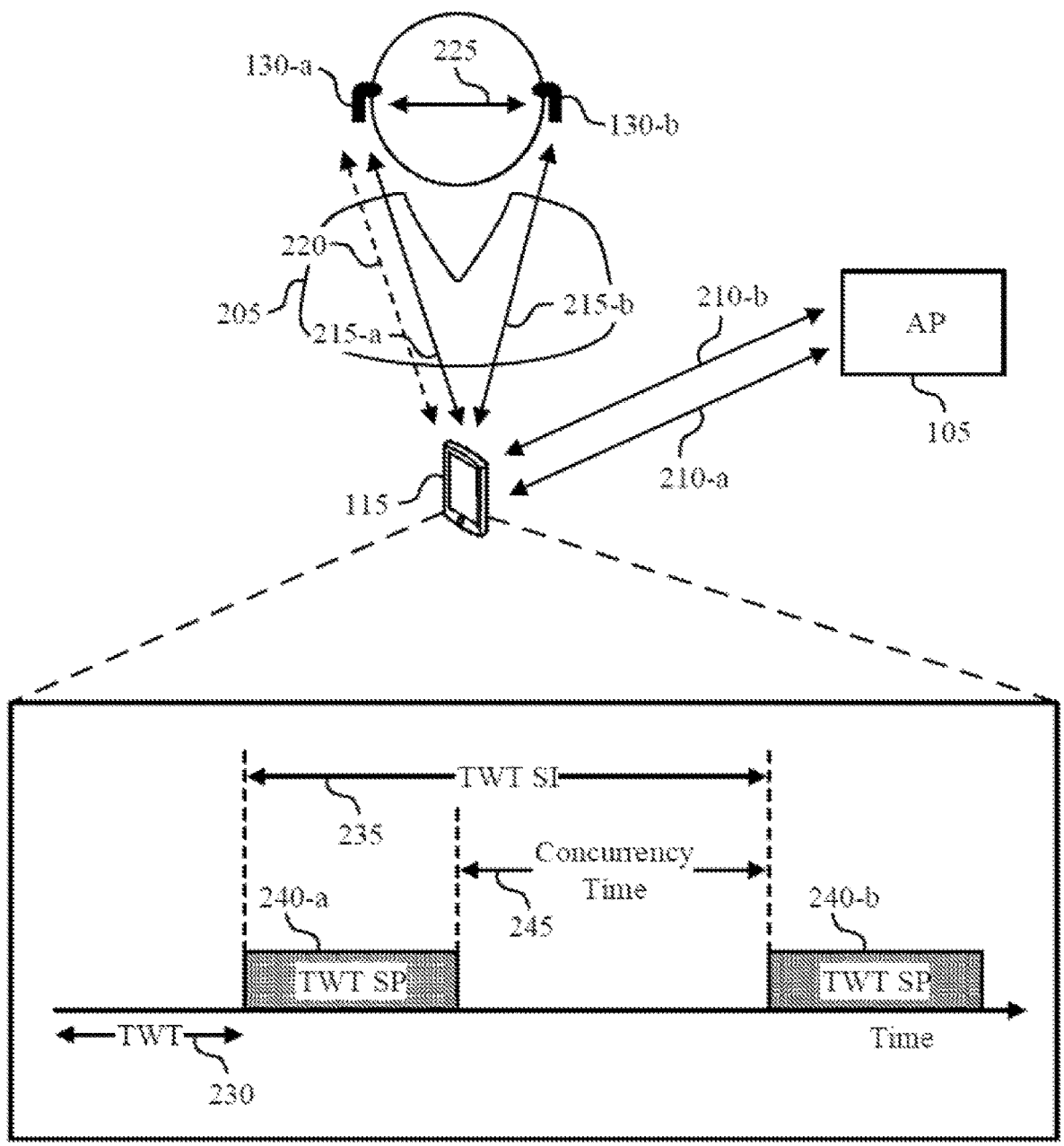
FIG. 2 illustrates an example of a wireless communication system that supports low-latency parameter updates for extended personal audio networks, in accordance with the present disclosure.

FIG. 2 illustrates an example of a wireless communication system 200 that supports low-latency parameter updates for extended personal audio networks in accordance with the present disclosure. The wireless communication system 200 may implement or be implemented to realize aspects of the wireless communication system 100. For example, the wireless communication system 200 illustrates communication between an AP 105, a device 115 (e.g., a handset or handheld device), and a wireless earbud 130-a and a wireless earbud 130-b of a user 205 (e.g., examples of audio devices and/or peripheral devices), which may be examples of corresponding devices as illustrated by and described with reference to FIG. 1. In some implementations, the device 115, the wireless earbud 130-a, and the wireless earbud 130-b may support a signaling-based mechanism according to which the device 115 may transmit an indication of a set of updated parameters to each of the wireless earbud 130-a and the wireless earbud 130-b via one or audio data packets.

In some deployments, the device 115 may communicate with the AP 105 via one or both of a link 210-a and a link 210-b, which may be examples of infrastructure links between the AP 105 and the device 115. The link 210-a may be an example of a 2.4 GHz link between the AP 105 and the device 115, and the link 210-b may be an example of a 5 GHz link or a 6 GHz link between the AP 105 and the device 115. Further, the device 115 may communicate wirelessly with each of the wireless earbud 130-a and the wireless earbud 130-b, where each of the wireless earbud 130-a and the wireless earbud 130-b may be associated with an XPAN of the device 115. For example, the device 115 may communicate with the wireless earbud 130-a via a link 215-a and may communicate with the wireless earbud 130-b via a link 215-b, where the link 215-a and the link 215-b may be referred to or understood as XPAN links. The link 215-a may be an example of a 5 GHz link or a 6 GHz link and the link 215-b may be an example of a 5 GHz link or a 6 GHz link. Additionally, in some examples, the device 115 may communicate with the wireless earbud 130-a, which may be an example of a primary earbud, via a communication link 220. The communication link 220 may be an example of a Bluetooth link between the device 115 and the wireless earbud 130-a. The wireless earbud 130-a and the wireless earbud 130-b, which may be an example of a secondary earbud, may communicate with each other via a link 225, which may be an example of a Bluetooth link between the wireless earbud 130-a and the wireless earbud 130-b.

In some cases, the device 115, the wireless earbud 130-a, and the wireless earbud 130-b may support or belong to an XPAN and may use the XPAN to support one or more applications or use cases, such as applications or use cases associated with latency or lossless audio constraints or criteria. For example, the device 115 may support one or more use cases of ULL gaming and streaming lossless audio to the wireless earbud 130-a and the wireless earbud 130-b (e.g., personal devices of the device 115). For such applications, the device 115 may be expected to keep end-to-end latency below a relatively stringent latency target (e.g., 40 ms for ULL gaming). Further, the device 115 may also be tasked with handling (e.g., gracefully handling) a coexistence of XPAN traffic (e.g., traffic to or from one or both of the wireless earbud 130-a and the wireless earbud 130-b) with other concurrency scenarios the user 205 or the system may initiate. Such other concurrency scenarios may include a scan concurrency for channel selection, STA infrastructure link concurrency for online gaming or other traffic to or from the AP 105, or neighbor aware networking (NAN) discovery and NAN data transfer, or any combination thereof.

The device 115 may be expected to meet a latency constraint for various applications or use cases (e.g., an ultra-low-latency constraint for a ULL gaming use case) and also facilitate coexistence between XPAN and other concurrency scenarios on the device 115. To meet the latency constraints associated with, for example, ULL gaming, a power constraint of the wireless earbud 130-*a* and the wireless earbud 130-*b*, and/or power and concurrency constraints at the device 115, the device 115 may employ a TWT technique for the communication between the device 115 (which may act or function as an SAP) and each of the wireless earbud 130-*a* and wireless earbud 130-*b* (which may act or function as STAs).

Example TWT parameters include a TWT 230, a TWT SI 235, and a TWT service period (SP) 240. A TWT 230 may indicate or be associated with a timing synchronization function (TSF) time indicating a start or beginning of a first TWT session. A TWT SI 235 may indicate a TWT interval, which may refer to a time difference between a start or beginning of two consecutive TWT sessions. A TWT SP 240 may indicate a duration during which one or both of the wireless earbud 130-*a* and the wireless earbud 130-*b* are awake during a TWT SI 235. In some aspects, a TWT SP 240 may be referred to or understood as a TWT session. As illustrated by FIG. 2, the TWT SI 235 may indicate a time difference between a TWT SP 240-*a* and a TWT 240-*b*. A remainder of time within a TWT SI 235 excluding a TWT SP 240 may be referred to or understood as a concurrency time 245 during which the device 115 may perform any operations (e.g., transmission or reception) associated with a concurrency scenario at the device 115. In other words, the difference between XPAN TWT SI 235 and XPAN TWT SP 240 may be the time left for the device 115 to support other concurrencies (e.g., outside of any channel switching or software overheads).

For XPAN, each of the wireless earbud 130-*a* and the wireless earbud 130-*b* (which may be examples of TWT requesting STAs) may initiate a TWT session with the device 115 (which may be an example of a TWT responding STA). Further, for low-latency use cases (e.g., ULL gaming use cases), a target end-to-end latency may be relatively stringent (e.g., less than or equal to approximately 40 ms), which may be tied to, associated with, or expect a Wi-Fi latency in a specific range (e.g., in the sub-10 ms range). To achieve such a Wi-Fi latency, a TWT SI 235 and a TWT SP 240 may be selected or set to specific values (e.g., a TWT SI 235 may be set to 4 ms with a TWT SP 240 of 2 ms). Further, for a lossless audio use case, for example, a TWT SI 235 may be set to approximately 70 ms with a TWT SP 240 of approximately 23 ms.

In some cases, a default or initial set of TWT parameters for XPAN may be configured or set expecting ideal (e.g., interference-free or approximately interference-free) conditions (e.g., link conditions, channel conditions, or environmental conditions). In some deployments, Wi-Fi channel conditions, a concurrency situation of the device 115, or XPAN constraints may change over time. Such changes may trigger, be associated with, or mandate a TWT parameter update. Further, in applications or use cases associated with low latency (e.g., ULL gaming and streaming lossless audio), the TWT parameter update may be expected to be performed with low latency to continue to meet XPAN constraints without compromising a user experience. As an example, for XPAN gaming use cases, a TWT SP 240 may be approximately 2 ms. A communication overhead of the updated TWT parameters, or other information communicated from the device 115 to the wireless earbud 130-*a* and the wireless earbud 130-*b*, may also be expected to be relatively small.

In some systems, however, a TWT parameter update procedure may be associated with a relatively high latency. Further, because TWT sessions may be initiated by the wireless earbud 130-*a* and the wireless earbud 130-*b* (with default or initial parameters), any update for TWT parameters triggered by a condition change on the device 115 may involve the device 115 transmitting the updated parameters to the wireless earbud 130-*a* and the wireless earbud 130-*b* followed by a TWT parameter change at the wireless earbud 130-*a* and the wireless earbud 130-*b*.

An example TWT parameter update procedure may include a sequence of signaling steps that involve one or more transmissions using a Bluetooth link, which may introduce relatively large delays. For example, a Wi-Fi sub-system (SS) of the device 115 may send, to a Bluetooth host (BT host) of the device 115, a request (e.g., a TWT parameter update request) to update one or more TWT parameters after one or more conditions are detected that trigger one or more TWT parameter changes. The BT host of the device 115 may communicate an updated set of TWT parameters to a BT host of a primary earbud (e.g., the wireless earbud 130-*a*) using a Bluetooth link. Such an updated TWT configuration sent via a Bluetooth link may add approximately 80 ms of delay. The BT host of the primary earbud may signal the new TWT parameters internally to a Wi-Fi SS of the primary earbud, and the BT host of the primary earbud may communicate the new TWT parameters to a BT host of a secondary earbud (e.g., the wireless earbud 130-*b*) using a Bluetooth link. Such an indication of a TWT configuration via a Bluetooth link between the primary earbud and the secondary earbud may add approximately 120 ms of delay. The BT host of the secondary earbud may signal the new TWT parameters internally to a Wi-Fi SS of the secondary earbud.

The Wi-Fi SS of the primary earbud may start a TWT session teardown and parameter update process. The TWT session teardown and parameter update process may involve a transmission, from the Wi-Fi SS of the primary earbud to the Wi-Fi SS of the device 115 via an XPAN Wi-Fi link, of a TWT Teardown message and a TWT Request message that carries the new TWT parameters and a transmission, from the Wi-Fi SS of the device 115 to the Wi-Fi SS of the primary earbud via the XPAN Wi-Fi link, of an acknowledgement (ACK) of the new TWT parameters with a TWT Response message. The Wi-Fi SS of the device 115 may update the BT host of the device 115 that a new TWT session with the primary earbud has been established (e.g., the Wi-Fi SS may indicate a TWT session update to the BT host). Such a TWT session teardown and parameter update process may additionally be performed between the device 115 and the secondary earbud.

In accordance with such a TWT parameter update procedure, the device 115 may incur a relatively large delay between the time that a condition is triggered on the device 115 associated with a TWT parameter update and the time that the updated parameters take effect. For example, some components of the delay may include a delay of approximately 80 ms associated with the updated TWT configuration sent via the Bluetooth link between the device 115 and the primary earbud, a delay of approximately 100 ms associated with a sniff exit delay if the Bluetooth link between the two earbuds is in sniff mode, a delay of approximately 20 ms associated with the updated TWT configuration sent via the Bluetooth link between the two earbuds, and a delay of approximately 5 ms associated with the teardown of the TWT sessions and the re-establishment of new TWT sessions from both earbuds. Accordingly, such a TWT parameter update procedure may be associated with a total end-to-end delay of approximately 205 ms for a one-time TWT parameter update, which may be too much for some applications or use cases (e.g., ULL gaming and streaming lossless audio use cases).

In some implementations, the device 115, the wireless earbud 130-a, and the wireless earbud 130-b may support a data-packet-generation-based and signaling-based mechanism according to which the device 115 may embed an indication of one or more updated parameters in one or more audio data packets that the device 115 may transmit to the wireless earbud 130-a and the wireless earbud 130-b. For example, if the device 115 detects a change that triggers a parameter update, or if the device 115 otherwise determines to transmit a set of parameters to the wireless earbud 130-a and the wireless earbud 130-b with low latency, the device 115 may embed the parameters in one or more downlink audio data packets and may transmit the one or more downlink audio data packets to the wireless earbud 130-a and the wireless earbud 130-b. In some implementations, the device 115 may transmit an indication of the parameters to the wireless earbud 130-a via a first audio data packet transmitted using a first Wi-Fi link (e.g., a first XPAN Wi-Fi link) and may transmit an indication of the parameters to the wireless earbud 130-b via a second audio data packet transmitted using a second Wi-Fi link (e.g., a second XPAN Wi-Fi link). The first audio data packet and the second audio data packet may include the same information or may include different information, and each may be examples of physical layer convergence protocol (PLCP) protocol data units (PPDUs).

The device 115 may convey a set of one or more parameters to both of the wireless earbud 130-a and the wireless earbud 130-b in the course of expected downlink data transmissions or traffic (e.g., without using any additional or dedicated signaling). In accordance with such a lack of additional over-the-air Bluetooth or Wi-Fi signaling between the device 115 and each of the wireless earbud 130-a and the wireless earbud 130-b, and between the wireless earbud 130-a and the wireless earbud 130-b, a total end-to-end delay may be one or a relatively small quantity of TWT SIs 235, which may correspond to a delay of approximately 4 or 8 ms for some applications or use cases (e.g., ULL gaming). Such a delay of approximately 4 or 8 ms may represent a significant cut down in end-to-end delay of TWT parameter renegotiation compared to other example parameter update procedures (which may incur delays of approximately 205 ms).

The device 115, the wireless earbud 130-a, and the wireless earbud 130-b may achieve up to approximately 50× faster response time to any condition change on an XPAN or infrastructure link associated with the device 115. In other words, the described techniques may allow or facilitate an agile XPAN system that can adapt to changing wireless conditions associated with an XPAN or infrastructure link at the device 115. Accordingly, the described techniques may be applicable to any latency-sensitive applications or use cases using TWT as the communication protocol between potentially power-constrained devices or any other use cases that are associated with or expect low-latency XPAN parameter updates from a default or initial set of programmed values.

Further, the described techniques may allow or facilitate an updating of one or more TWT parameters at the same time and may additionally, or alternatively, be used for communicating any other information (XPAN-related or otherwise) between the device 115, the wireless earbud 130-a, and the wireless earbud 130-b in a fast and efficient way. For examples, the parameters that may be communicated between the device 115 and each of the wireless earbud 130-a and the wireless earbud 130-b may include a set of one or more TWT parameters, a received signal strength indicator (RSSI) measured at either the device 115 or one or both of the wireless earbud 130-a and the wireless earbud 130-b that is expected to be communicated to the device 115 or one or both of the wireless earbud 130-a and the wireless earbud 130-b, a channel switch indication or request, or a bearer switch indication or request. Such one or more TWT parameters may include any one or more of a TWT SI 235, a TWT SP 240, or a TWT start time (e.g., a TWT 230). Further, such a bearer switch indication or request may be a request for a switch from an XPAN bearer to a Bluetooth bearer, or vice versa.

In some networks using XPAN communications, the networks may support ULL gaming with end-to-end latency parameters along with coexistence with concurrency scenarios in which a WCD has wireless links to an audio device and additional devices. To meet the latency requirements for ULL gaming, power requirements of the audio device and power and concurrency requirements on the WCD, a TWT technique may be is used for communication between the WCD (e.g., acting as an SAP) and the audio device (e.g., acting as an STA). The TWT may be a TSF time indicating a start of a first TWT session. An SI indicates the TWT interval (e.g., a time difference between a start of two consecutive TWT sessions). An SP indicates a duration the audio device will be awake during an SI. A concurrency time is a difference between the SP and the SI and is a time remaining for the WCD to support the additional concurrencies (e.g., communications via additional wireless links). The faster gaming traffic is successfully delivered between the WCD and the audio device, the more concurrency time that can be achieved on an infra link of the WCD. For XPAN, each audio device (e.g., a TWT-requesting STA) may initiate a TWT session with the WCD (e.g., a TWT responding STA).

Figure 3:
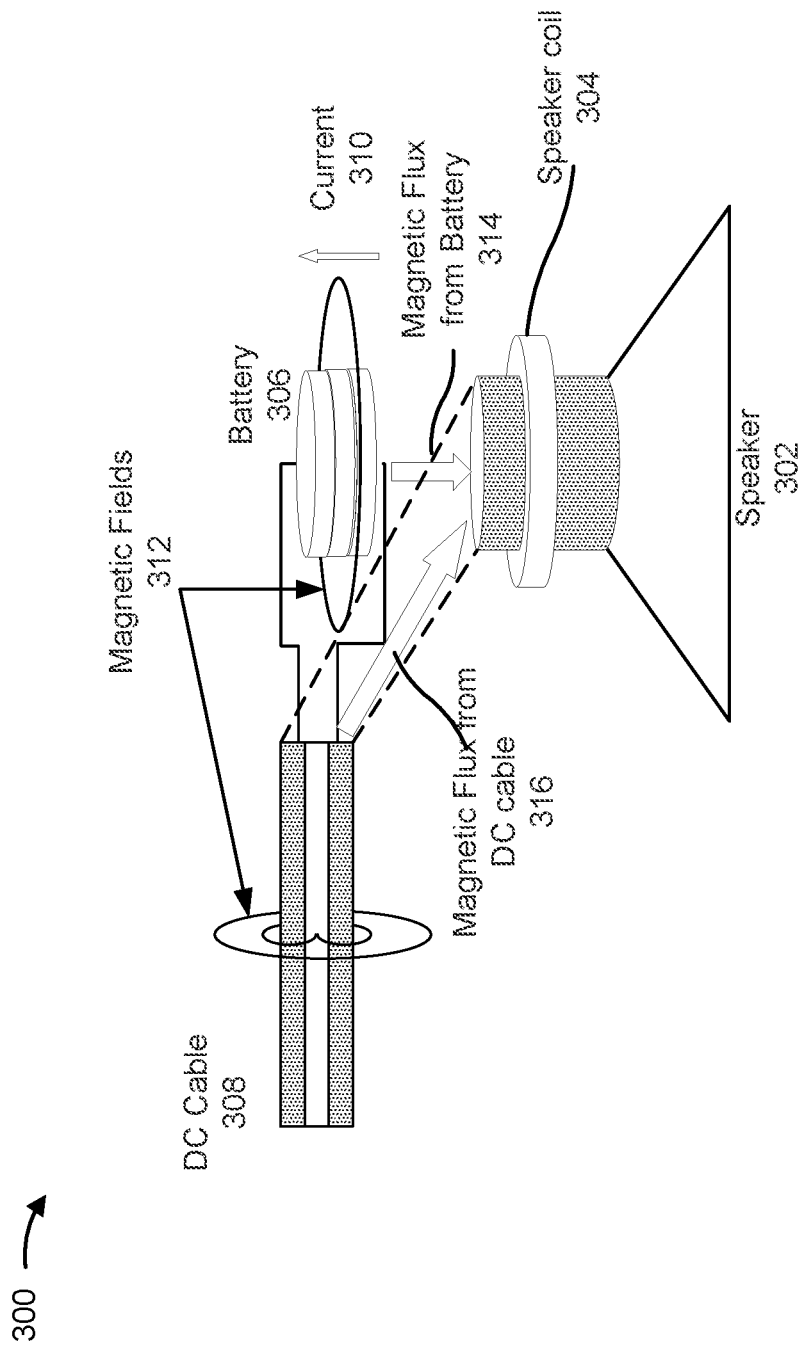
FIG. 3 illustrates an example of an audio device, in accordance with the present disclosure.

FIG. 3 illustrates an example 300 of an audio device, in accordance with the present disclosure. As shown, FIG. 3, an audio device may include a speaker 302, a speaker coil 304 (e.g., to convert an electrical signal into audio signals), a battery 306, and a direct current (DC) cable that connects the battery 306 to the speaker 302.

In some audio devices (e.g., wireless-communication-enabled audio devices), the DC cable 308 and the battery 306 may produce magnetic fields 312 based at least in part on (e.g., proportional to) a DC current (e.g., current 310). The magnetic fields 312 may produce magnetic flux 316 from the DC cable 308 and magnetic flux 314 from the battery 306. The magnetic flux (e.g., a total of the magnetic flux 314 and 316) into the speaker coil 304, which may be shunted by an audio power amplifier (PA) output resistance, which may provide 0.1 ohms along with associated wires. When the DC current changes, the magnetic flux through the speaker coil 304 changes as well. A change of the magnetic flux through the speaker coil 304 may induce a voltage in the speaker coil 304. The voltage in the speaker coil 304 may cause a rising current in coils of the speaker coil 304. The rising current may cause the speaker 302 to release energy of the coils and produce a sound of one or more clicks.

In some audio devices, a manufacturer may use a hardware-based solution, such as a magnetic shielding and/or power supply unit coupling, among other examples. However, hardware-based solutions may increase a cost of the audio devices and/or may consume limited space within the audio devices.

As indicated above, FIG. 3 is provided as an example. Other examples may differ from what is described with regard to FIG. 3.

Figure 4:
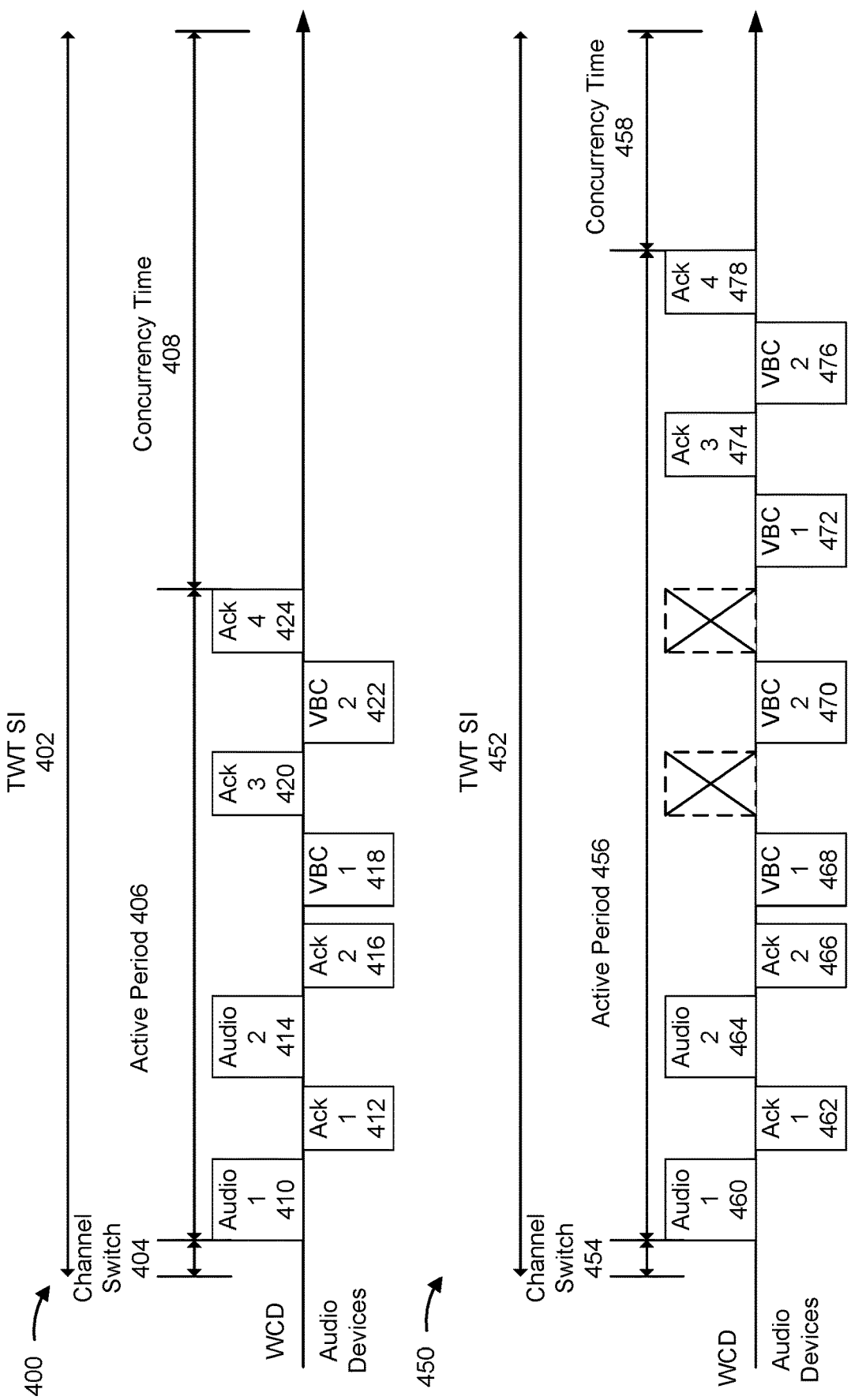
FIG. 4 illustrates examples of target wake time (TWT) packet sequences, in accordance with the present disclosure.

FIG. 4 illustrates examples 400 and 450 of TWT packet sequences, in accordance with the present disclosure. In the context of FIG. 4, a WCD may communicate with one or more audio devices. For example, the WCD may communicate with a first audio device and a second audio device.

As shown in example 400, the WCD may communicate with the one or more audio devices using a TWT technique. The TWT may include a TWT SI 402 associated with a periodicity of TWT communication occasions. The TWT SI 402 may include a channel switch time 404 during which the WCD and/or the one or more audio devices may tune to a channel associated with communicating together. The TWT SI 402 may include an active period 406 during which the WCD and the one or more audio devices exchange communications. After the active period, the TWT SI 402 may include a concurrency time 408 during which the WCD and the audio devices are not schedule communicate with each other via a TWT-based communication.

In the example 400, the WCD may transmit a first audio communication (audio 1) 410 to a first audio device. The first audio device may respond with an acknowledgement (ACK 1) 412 to indicate reception of the first audio communication 410. Similarly, the WCD may transmit a second audio communication 414 (audio 2) to a second audio device. The second audio device may respond with an acknowledgment (ACK 2) 416 to indicate reception of the second audio communication 410.

The first audio device may transmit an uplink communication (VBC 1) 418 to the WCD. The WCD may respond with an acknowledgment (ACK 3) 420 to indicate reception of the uplink communication 418. Similarly, the second audio device may transmit an uplink communication (VBC 2) 422 to the WCD. The WCD may respond with an acknowledgment (ACK 4) 416 to indicate reception of the uplink communication 422.

In the example 450, the one or more audio devices may retransmit one or more communications based at least in part on the WCD failing to respond with an ACK to an uplink communication. In example 450, the TWT may include a TWT SI 452 associated with a periodicity of TWT communication occasions. The TWT SI 452 may include a channel switch time 454 during which the WCD and/or the one or more audio devices may tune to a channel associated with communicating together. The TWT SI 452 may include an active period 456 during which the WCD and the one or more audio devices exchange communications. After the active period, the TWT SI 452 may include a concurrency time 458 during which the WCD and the audio devices are not schedule communicate with each other via a TWT-based communication.

In the example 450, the WCD may transmit a first audio communication (audio 1) 460 to a first audio device. The first audio device may respond with an acknowledgement (ACK 1) 462 to indicate reception of the first audio communication 460. Similarly, the WCD may transmit a second audio communication 464 (audio 2) to a second audio device. The second audio device may respond with an acknowledgment (ACK 2) 466 to indicate reception of the second audio communication 460.

The first audio device may transmit an uplink communication (VBC 1) 468 (audio 1) to the WCD. The first audio device may fail to receive an acknowledgment to indicate reception of the uplink communication 468. Similarly, the second audio device may transmit an uplink communication (VBC 2) 470 to the WCD. The second audio device may fail to receive an acknowledgment to indicate reception of the uplink communication 470.

Based at least in part on failing to receive an ACK from the WCD, the first audio device and the second audio device may retransmit the first uplink communication 468 and the second uplink communication 468 to the WCD. For example, the first audio device may transmit a retransmission of uplink communication (VBC 1) 472 to the WCD. The WCD may respond with an acknowledgment (ACK 3) 734 to indicate reception of the retransmission of uplink communication 468. Similarly, the second audio device may transmit an retransmission of uplink communication (VBC 2) 476 to the WCD. The WCD may respond with an acknowledgment (ACK 4) 478 to indicate reception of the retransmission of the uplink communication 476.

As shown in FIG. 4, a TWT active period may be longer, and a concurrency time may be shorter, when retransmissions occur.

As indicated above, FIG. 4 is provided as an example. Other examples may differ from what is described with regard to FIG. 4.

In some audio devices (e.g., wireless-communication-enabled audio devices), a direct current (DC) cable and battery may produce a magnetic field proportional to the DC current. The magnetic field may provide magnetic flux into a speaker coil, which may be shunted by an audio power amplifier (PA) output resistance, which may provide 0.1 ohms along with associated wires. When the DC current changes, the magnetic flux through speaker coil changes as well. A change of magnetic flux through the speaker coil may induce a voltage in the speaker coil. The voltage in the speaker coil may cause a rising current in the coils. The rising current may cause the speaker to release energy of the coils and produce a sound of one or more clicks.

In some audio devices, a manufacturer may use a hardware-based solution, such as a magnetic shielding and/or power supply unit coupling, among other examples. However, hardware-based solutions may increase a cost of the audio devices and/or may consume limited space within the audio devices.

In some aspects described herein, a WCD and an audio device may use intelligent packet scheduling and/or traffic shaping on the WCD and/or the audio device to mitigate clicking from magnetic coupling on the audio device (e.g., earbuds). In some aspects, the WCD and the audio device may communicate in one of a set of candidate communication states (configurations). For example, each candidate communication state may be associated with values of communication parameters, such as a periodicity of uplink traffic, a periodicity of downlink traffic, an uplink transmission power, or an MCS. Each candidate communication state may differ from each other candidate communication state with at least one value of the communication parameters.

The WCD and the audio device may transition between candidate communication states based at least in part on a configuration switch trigger. The configuration switch trigger may be based at least in part on a link quality metric or a change in a use state of the WCD. For example, the configuration switch trigger may be based at least in part on an increase or decrease in a signal strength (e.g., received signal strength indication (RSSI)), a screen state detection (e.g., locked screen, always on display, or active display, among other examples), and/or an operating mode detection (e.g., based at least in part on operating system information).

Based at least in part on selecting a communication state using configuration switch triggers, the WCD may reduce clicks and/or other noise caused by voltage induced in a speaker coil by DC current changes.

In some aspects, the WCD may include a communication manager. As described in more detail elsewhere herein, the communication manager may communicate, via a wireless link, with an audio device using a first configuration having first values for communication parameters, the communication parameters including one or more of: a periodicity of uplink traffic, a periodicity of downlink traffic, an uplink transmission power, or an MCS; and transmit an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters. Additionally, or alternatively, the communication manager may perform one or more other operations described herein.

In some aspects, the audio device may include a communication manager. As described in more detail elsewhere herein, the communication manager may communicate, via a wireless link, with a WCD using a first configuration having first values for communication parameters, the communication parameters including one or more of: a periodicity of uplink traffic, a periodicity of downlink traffic, an uplink transmission power, or an MCS; and receive an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters. Additionally, or alternatively, the communication manager may perform one or more other operations described herein.

In some aspects, the WCD includes means for communicating, via a wireless link, with an audio device using a first configuration having first values for communication parameters, the communication parameters including one or more of: a periodicity of uplink traffic, a periodicity of downlink traffic, an uplink transmission power, or an MCS; and/or means for transmitting an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters. In some aspects, the means for the WCD to perform operations described herein may include, for example, one or more of a communication manager, a transmit processor, a TX MIMO processor, a modem, an antenna, a MIMO detector, a receive processor, a controller/processor, a memory, or a scheduler.

In some aspects, the audio device includes means for communicating, via a wireless link, with a WCD using a first configuration having first values for communication parameters, the communication parameters including one or more of: a periodicity of uplink traffic, a periodicity of downlink traffic, an uplink transmission power, or an MCS; and/or means for receiving an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters. In some aspects, the means for the audio device to perform operations described herein may include, for example, one or more of a communication manager, a transmit processor, a TX MIMO processor, a modem, an antenna, a MIMO detector, a receive processor, a controller/processor, a memory, or a scheduler.

Figure 5:
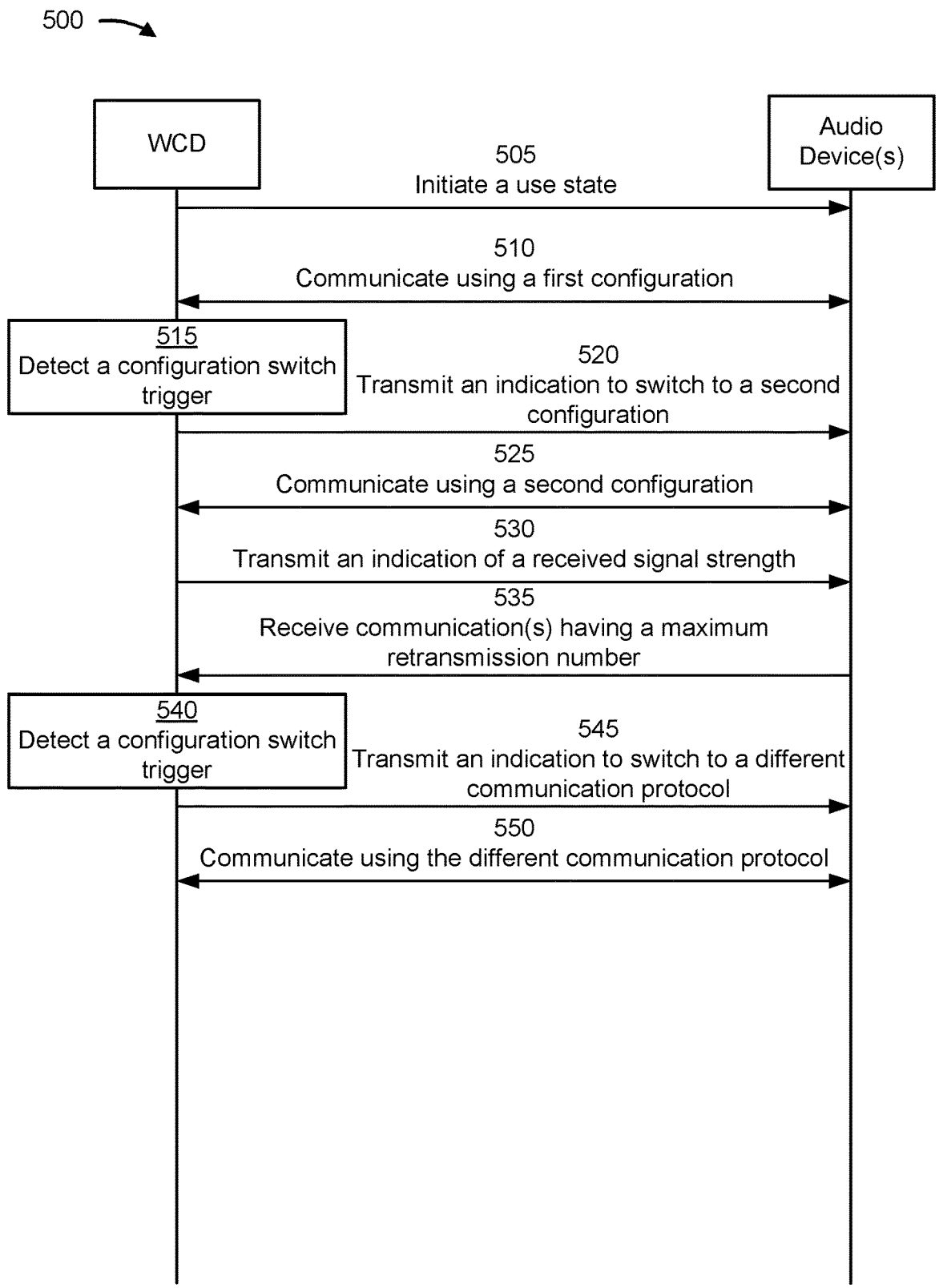
FIG. 5 is a diagram of an example associated with configuration switch triggers for audio device communications, in accordance with the present disclosure.

FIG. 5 is a diagram of an example 500 associated with configuration switch triggers for audio device communications, in accordance with the present disclosure. As shown in FIG. 5, WCD (e.g., a STA, a UE, or host device, among other examples) may communicate with one or more audio devices (e.g., earbuds). In some aspects, the WCD and the one or more audio devices may have established a wireless connection prior to operations shown in FIG. 5.

As shown by reference number 505, the WCD may initiate a use state for wireless communication with the one or more audio devices. In some aspects, the use state may be associated with use for gaming, use for lossless audio, and/or other uses.

As shown by reference number 510, the WCD and the one or more audio devices may communicate using a first configuration. The first configuration may be associated with a set of communication parameters. For example, the communication parameters may include a periodicity of uplink traffic, a periodicity of downlink traffic, an uplink transmission power, and/or a MCS, among other examples.

In some aspects, the first configuration may be associated with communication parameters, such as a first maximum number of uplink data retransmissions, a first maximum number of uplink acknowledgment (ACK) retransmissions, a first delayed block ACK transmission policy, a first quality of service (QoS) configuration, and/or a first configuration for transmission of traffic of an additional communication protocol that is different from a communication protocol associated with the wireless link, among other examples. These parameters may be used to reduce voltage-induced interference in an audio output of the audio device.

As shown by reference number 515, the WCD may detect a configuration switch trigger. In some aspects, the configuration switch trigger may be based at least in part on a link quality metric associated with the wireless link or a change of a use state of the WCD. In some aspects, the link quality metric may include a received RSSI value, a number of dropped packets, a number of retransmissions, and/or a packet error rate, among other examples.

In some aspects, the RSSI value used to detect the configuration switch trigger may be an average of a set of RSSI values (e.g., most recent RSSI values). The set of RSSI values may be based at least in part on measurements by the WCD or an indication of measurements by the one or more audio devices, among other examples.

In some aspects, the change of the use state of the WCD may include stopping of a low-latency data stream, deactivation of a screen, and/or exiting of an application associated with the downlink traffic or the uplink traffic, among other examples.

As shown by reference number 520, the WCD may transmit, and the one or more audio devices may receive, an indication to switch to a second configuration. In some aspects, the WCD may transmit the indication via an index associated with the second configuration, a proper subset of the second values, and/or all of the second values, among other examples. For example, the WCD may indicate, using the index, to use the second configuration, including communication parameters associated with the second configuration. In some aspects, the WCD may indicate one or more of the communication parameters (e.g., explicit values or related to values of the first configuration) that should be changed to switch from the first configuration to the second configuration. In some aspects, the WCD may indicate values (e.g., explicit or related to values of the first configuration) of the communication parameters to use. The communication parameters may constitute the second configuration.

In some aspects, the WCD may transmit a first message that indicates to switch to a second value for the uplink transmission power and then transmit a second message to switch to one or more of a second value for the periodicity of the uplink traffic or a second value for the periodicity of the downlink traffic. In some aspects, the WCD may transmit a single message that indicates to switch to the second value for the uplink transmission power and to switch to one or more of the second value for the periodicity of the uplink traffic or the second value for the periodicity of the downlink traffic.

In some aspects, a first subset of the communication parameters is dependent on a second subset of communication parameters. For example, a transmission power may be based at least in part on an MCS and/or a maximum repetition number. Additionally, or alternatively, a maximum repetition number may be based at least in part on a transmission power and/or an MCS. Based at least in part on dependency, the indication to switch to the second configuration may indicate the second subset of communication parameters (and omit an indication of one or more of the first subset of communication parameters). In this way, a payload of the indication to switch to the second configuration may be reduced and the one or more audio devices may derive the first subset of the communication parameters from the first subset of communication parameters.

As shown by reference number 525, the WCD and the one or more audio devices may communicate using a second configuration. The second configuration may be associated with a set of communication parameters. For example, the communication parameters may include a periodicity of uplink traffic, a periodicity of downlink traffic, an uplink transmission power, and/or a MCS, among other examples. In some aspects, the second configuration may have values for the communication parameters associated with a reduction in voltage-induced interference in an audio output of the audio device.

In some aspects, the second configuration is associated with communication parameters, such as a second maximum number of uplink data retransmissions that is different from the first maximum number of uplink data retransmissions, a second maximum number of uplink ACK retransmissions that is different from the first maximum number of uplink ACK retransmissions. In some aspects, the second configuration is associated with a second delayed block ACK transmission policy that is different from the first delayed block ACK transmission policy, a second QoS configuration that is different from the first QoS configuration, and/or a second configuration for transmission of traffic of the additional communication protocol that is different from the first configuration for transmission of traffic of the additional communication protocol, among other examples. In some aspects, the second configuration may be used to reduce voltage-induced interference in an audio output of the audio device relative to the first configuration. Alternatively the first configuration may be used to reduce voltage-induced interference in the audio output of the audio device relative to the second configuration. For example, the communication parameters of the second configuration may reduce voltage-induced interference based at least in part on reducing a density of transmissions from the audio device and/or a power density of transmissions over time.

As shown by reference number 530, the WCD may transmit and the one or more audio devices may receive, an indication of a received signal strength. For example, the received signal strength may be associated with an uplink communication during communication using the second configuration.

As shown by reference number 535, the WCD may receive, and the one or more audio devices may transmit, one or more communications having a maximum retransmission number. For example, the one or more communications may have a maximum retransmission number based at least in part on the received signal strength of the uplink communication.

In some aspects, the WCD may transmit, before receiving the one or more communications having the maximum retransmission number, an indication of a mapping of MCS values and downlink transmission powers. The WCD may have transmitted an indication of the MCS value for downlink communication and/or uplink communications (e.g., as part of the first configuration or the second configuration). The WCD may transmit a downlink communication while communicating using the second configuration and the one or more audio devices may transmit an uplink communication with a maximum retransmission number that is based at least in part on the uplink transmission power.

In some aspects, an audio device may measure RSSI of a received DL packet from the WCD. The audio device may calculate a path loss given knowledge of the MCS-TxPower mapping and the actual MCS used in the received DL packet. audio device may estimate the RSSI at the WCD using the calculated path loss and the uplink transmission power from the audio device. The audio device may then determine a maximum number of retries for the WCD RSSI, as estimated.

As shown by reference number 540, the WCD may detect a configuration switch trigger. In some aspects, the configuration switch trigger may be based at least in part on a link quality metric associated with the wireless link or a change of a use state of the WCD. In some aspects, the link quality metric may include a received RSSI value, a number of dropped packets, a number of retransmissions, and/or a packet error rate, among other examples.

In some aspects, the RSSI value used to detect the configuration switch trigger may be an average of a set of RSSI values (e.g., most recent RSSI values). The set of RSSI values may be based at least in part on measurements by the WCD or an indication of measurements by the one or more audio devices, among other examples.

In some aspects, the change of the use state of the WCD may include stopping of a low-latency data stream, deactivation of a screen, and/or exiting of an application associated with the downlink traffic or the uplink traffic, among other examples.

In some aspects, the WCD may detect that a link quality has degraded (e.g., based at least in part on one or more link quality metrics) and/or that the WCD has changed a use state of the WCD to a relaxed latency state.

As shown by reference number 545, the WCD may transmit, and the one or more audio devices may receive, an indication to switch to a different communication protocol.

For example, the WCD may indicate to switch to a Bluetooth communication protocol. In some aspects, the different communication protocol may be associated with an increased latency and/or an increased range relative to a communication protocol associated with the first configuration.

As shown by reference number 550, the WCD and the one or more audio devices may communication using the different communication protocol.

Based at least in part on the WCD indicating to switch between configurations and/or communication protocols, the WCD may reduce or avoid clicks and/or other noise caused by voltage induced in a speaker coil by DC current changes.

As indicated above, FIG. 5 is provided as an example. Other examples may differ from what is described with respect to FIG. 5.

Figure 6:
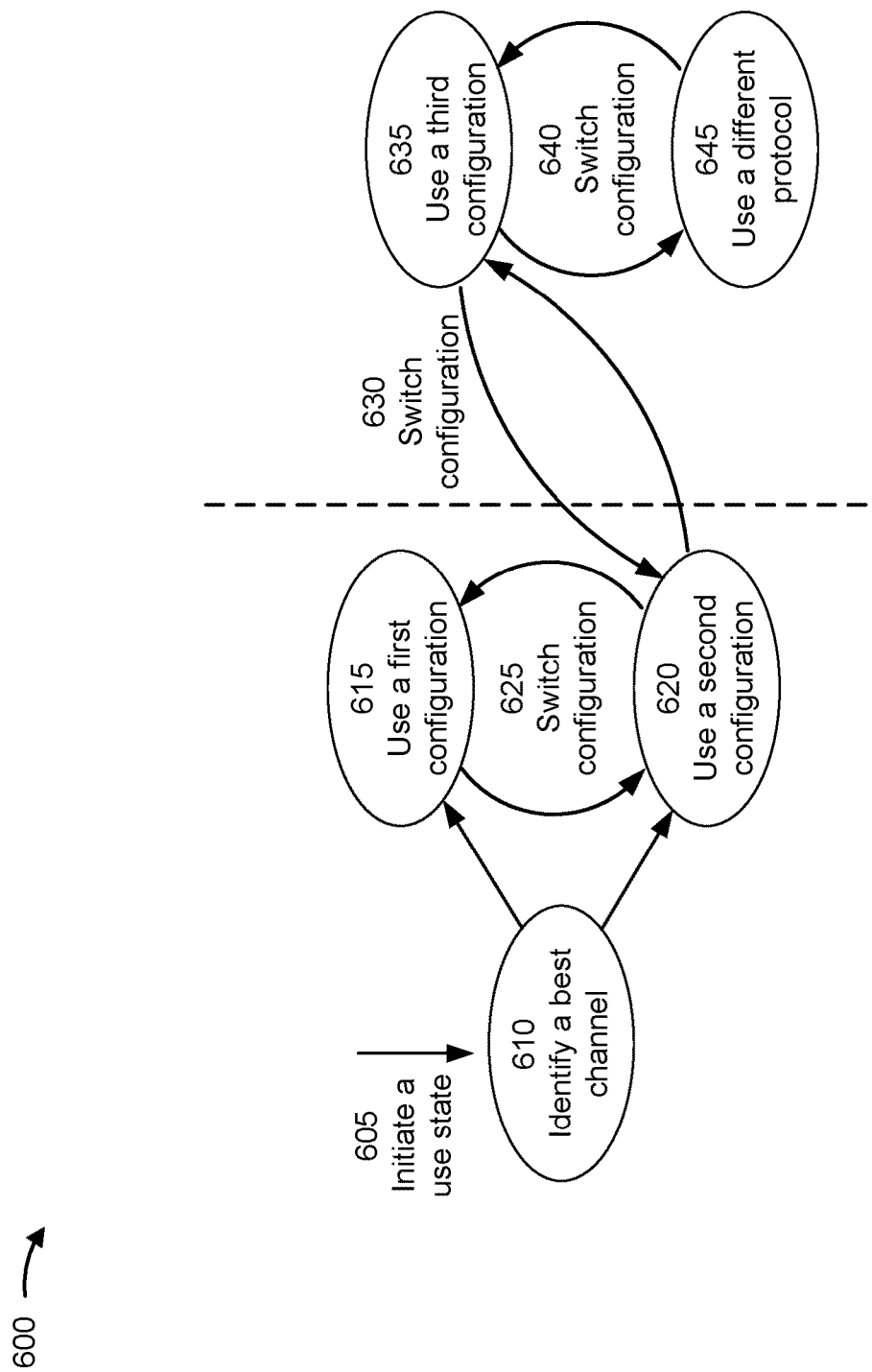
FIG. 6 is a diagram of an example associated with configuration switch triggers for audio device communications, in accordance with the present disclosure.

FIG. 6 is a diagram of an example 600 associated with configuration switch triggers for audio device communications, in accordance with the present disclosure. In context of FIG. 6, a WCD (e.g., a STA, a UE, or host device, among other examples) may communicate with one or more audio devices (e.g., earbuds). In some aspects, the WCD and the one or more audio devices may have established a wireless connection prior to operations shown in FIG. 6.

As shown by reference number 605, the WCD may initiate a use state. For example, the WCD may initiate a use state such as ULL gaming or streaming lossless audio.

As shown by reference number 610, the WCD may identify a best channel for communicating with the one or more audio devices. For example, the WCD and the one or more audio devices may measure reference signals to identify a best channel, having characteristics such as frequency band and/or directional beams. The best channel may be a channel with a strongest received power, a highest signal-to-noise ratio (SNR), and/or low interference, among other examples.

As shown by reference number 615, WCD may use a first configuration. The first configuration may be associated with ULL communications having a lowest latency and/or a lowest error rate. In some aspects, the first configuration may be associated with a first TWT SI for uplink communications and a second TWT SI for downlink communications. For example, the first configuration may be associated with a 4 ms downlink SI and a 16 ms uplink SI. In this way downlink SI has a smaller period between communication occasions and can provide downlink information with reduced latency. With a longer uplink SI, the WCD and the one or more audio devices may conserve network resources based at least in part on uplink communications being less often and/or with a relaxed latency requirement compared with downlink communications.

In some aspects, the first configuration may have a lowest power limit for uplink communications by the one or more audio devices. Additionally, or alternatively, the first configuration may have a highest MCS.

As shown by reference number 620, WCD may use a second configuration. The second configuration may be associated with ULL communications having a second lowest latency and/or a second lowest error rate. In some aspects, the second configuration may be associated with a third TWT SI for uplink communications and a fourth TWT SI for downlink communications. For example, the second configuration may be associated with an 8 ms downlink SI and a 16 ms uplink SI. In this way downlink SI has a smaller period between communication occasions and can provide downlink information with reduced latency, but with more latency than the first configuration.

In some aspects, the second configuration may have a second lowest power limit for uplink communications by the one or more audio devices. Additionally, or alternatively, the second configuration may have a second-highest MCS or an MCS equal to the MCS of the first configuration).

In some aspects, the WCD may initiate the use state by selecting the first configuration. In this case, the WCD may start in a lowest-latency configuration and switch out of the first configuration to the second configuration upon detection of a configuration switch trigger, as shown by reference number 625.

Alternatively, the WCD may initiate the use state by selecting the second configuration. In this case, the WCD may start in a second lowest-latency configuration and switch out of the second configuration upon detection of a configuration switch trigger. In this case the configuration switch trigger may indicate support for switching up to the first configuration or switching to a third configuration that has higher latency than the second configuration.

As shown by reference number 630, the WCD may switch a configuration from the second configuration to a use a third configuration shown by reference number 635. In some aspects, the third configuration may be associated with a latency that is higher than the second configuration. For example, the third configuration may be associated with a 16+ms SI for downlink communication and a 16-32+ms SI for uplink communications. Additionally, or alternatively, the third configuration may be associated with a power limit that is higher than configurations 1 and/or 2, and/or may be configured with an MCS that is lower (e.g., with less spectral efficiency) than configurations 1 and/or 2.

In some aspects, the third configuration may be associated with a change in a use state of the WCD and/or the one or more audio devices. For example, the WCD may have stopped presenting audio from a stream, such as a game. This change in the use state may be detected based at least in part on an RSSI drop, detection of a change in a screen state detection (e.g., screen locked and/or off), or detection of an operating mode detection using OS stats (e.g., gaming or lossless operation and/or high quality (HQ) or 3D-audio), among other examples.

As shown by reference number 635, the WCD may switch a configuration from the third configuration to using a different protocol, as shown by reference number 645. In some aspects, the WCD may switch to the different protocol (e.g., a Bluetooth protocol) based at least in part on the different protocol having a larger range and/or reduced power consumption.

In some aspects, the WCD may switch configurations to improved latency configurations based at least in part on improved link quality metrics, such as RSSI measurement values, a number of dropped packets, a number of retransmissions, and/or a packet error rate, among other examples. The improved link quality metrics may be associated with a reduced number of retransmissions or other actions that cause the speaker coils to accumulate and discharge energy that converts to unwanted sounds from the speakers.

In some aspects, the WCD may switch configurations to more relaxed latency configurations based at least in part on degraded link quality metrics, such as RSSI measurement values, a number of dropped packets, a number of retransmissions, and/or a packet error rate, among other examples. The degraded link quality metrics may be associated with an increased number of retransmissions or other actions that cause the speaker coils to accumulate and discharge energy that converts to unwanted sounds from the speakers. For this reason, transmission power may be reduced, MCS may be reduced (e.g., to reduce retransmissions) and/or SI may be increased for downlink communications to reduce an average amount of power used to communicate over time. In this way, the configurations may balance performance and the unwanted sounds from the speakers.

As indicated above, FIG. 6 is provided as an example. Other examples may differ from what is described with respect to FIG. 6.

Figure 7:
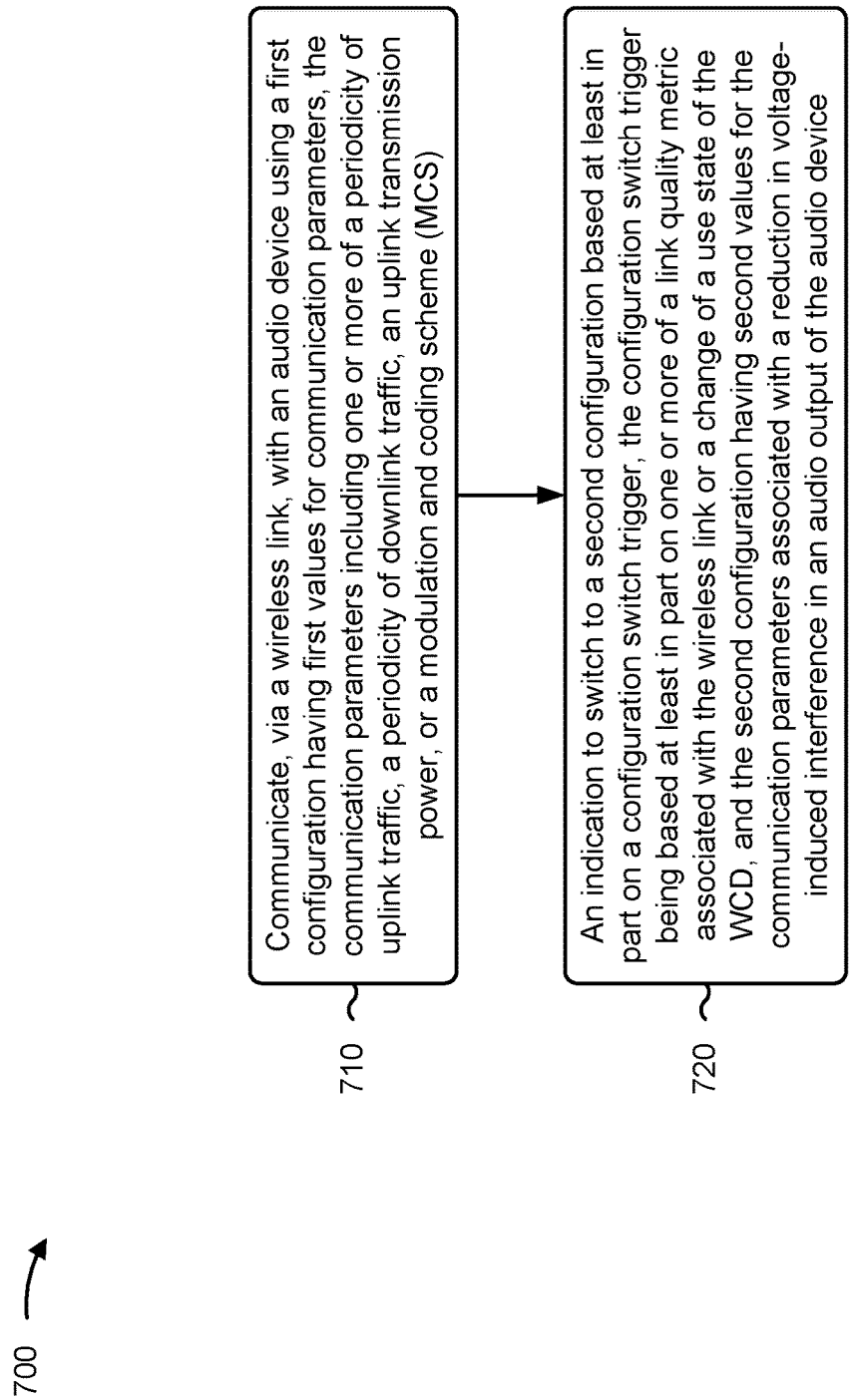
FIG. 7 is a diagram illustrating an example process performed, for example, by a WCD, in accordance with the present disclosure.

FIG. 7 is a diagram illustrating an example process 700 performed, for example, by a WCD, in accordance with the present disclosure. Example process 700 is an example where the WCD (e.g., a STA, a host device, or a UE) performs operations associated with configuration switch triggers for audio device communications.

As shown in FIG. 7, in some aspects, process 700 may include communicating, via a wireless link, with an audio device using a first configuration having first values for communication parameters, the communication parameters including one or more of: a periodicity of uplink traffic, a periodicity of downlink traffic, an uplink transmission power, or a MCS (block 710). For example, the WCD (e.g., using communication manager 906, depicted in FIG. 9) may communicate, via a wireless link, with an audio device using a first configuration having first values for communication parameters, the communication parameters including one or more of: a periodicity of uplink traffic, a periodicity of downlink traffic, an uplink transmission power, or a MCS, as described above.

As further shown in FIG. 7, in some aspects, process 700 may include an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters associated with a reduction in voltage-induced interference in an audio output of the audio device (block 720). For example, the WCD (e.g., using communication manager 906, depicted in FIG. 9) may an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters associated with a reduction in voltage-induced interference in an audio output of the audio device, as described above.

Process 700 may include additional aspects, such as any single aspect or any combination of aspects described below and/or in connection with one or more other processes described elsewhere herein.

In a first aspect, the indication to switch to the second configuration comprises an indication of an index associated with the second configuration, a proper subset of the second values, or all of the second values.

In a second aspect, alone or in combination with the first aspect, at least one of the first values is different from at least one of the second values.

In a third aspect, alone or in combination with one or more of the first and second aspects, process 700 includes transmitting an indication to switch from a first communication protocol to a second communication protocol based at least in part on an additional configuration switch trigger.

In a fourth aspect, alone or in combination with one or more of the first through third aspects, the additional configuration switch trigger is based at least in part on a degradation of a link quality or a change of a use state of the WCD to a relaxed latency state, and wherein the second communication protocol is associated with an increased latency or an increased range relative to the first communication protocol.

In a fifth aspect, alone or in combination with one or more of the first through fourth aspects, the link quality metric is based at least in part on one or more of a received RSSI value, a number of dropped packets, a number of retransmissions, or a packet error rate.

In a sixth aspect, alone or in combination with one or more of the first through fifth aspects, the RSSI value comprises an average of a set of most recent RSSI values.

In a seventh aspect, alone or in combination with one or more of the first through sixth aspects, the change of use state of the WCD comprises stopping of a low-latency data stream, deactivation of a screen, or exiting of an application associated with the downlink traffic or the uplink traffic.

In an eighth aspect, alone or in combination with one or more of the first through seventh aspects, the first configuration is associated with one or more of a first maximum number of uplink data retransmissions, a first maximum number of uplink ACK retransmissions, a first delayed block ACK transmission policy, a first QoS configuration, or a first configuration for transmission of traffic of an additional communication protocol that is different from a communication protocol associated with the wireless link, and wherein the second configuration is associated with one or more of a second maximum number of uplink data retransmissions that is different from the first maximum number of uplink data retransmissions, a second maximum number of uplink ACK retransmissions that is different from the first maximum number of uplink ACK retransmissions, a second delayed block ACK transmission policy that is different from the first delayed block ACK transmission policy, a second QoS configuration that is different from the first QoS configuration, or a second configuration for transmission of traffic of the additional communication protocol that is different from the first configuration for transmission of traffic of the additional communication protocol.

In a ninth aspect, alone or in combination with one or more of the first through eighth aspects, transmitting the indication to switch to the second configuration comprises transmitting a first message that indicates to switch to a second value for the uplink transmission power, and a second message, after the first message, to switch to one or more of a second value for the periodicity of the uplink traffic or a second value for the periodicity of the downlink traffic, or transmitting a single message that indicates to switch to the second value for the uplink transmission power and to switch to one or more of the second value for the periodicity of the uplink traffic or the second value for the periodicity of the downlink traffic.

In a tenth aspect, alone or in combination with one or more of the first through ninth aspects, one or more values of the second values are based at least in part on one or more additional values of the second values, and wherein the indication to switch to the second configuration includes an indication of the one or more additional values of the second values.

In an eleventh aspect, alone or in combination with one or more of the first through tenth aspects, process 700 includes transmitting an indication of a received signal strength of an uplink communication, and receiving one or more communications having a maximum retransmission number based at least in part on the received signal strength of the uplink communication.

In a twelfth aspect, alone or in combination with one or more of the first through eleventh aspects, process 700 includes transmitting an indication of a mapping of MCS values and downlink transmission powers, transmitting an indication of an MCS value for a downlink communication, transmitting the downlink communication, and receiving an uplink communication having a maximum retransmission number that is based at least in part on the uplink transmission power.

In a thirteenth aspect, alone or in combination with one or more of the first through twelfth aspects, the indication is carried in the communication with the audio device via the wireless link.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
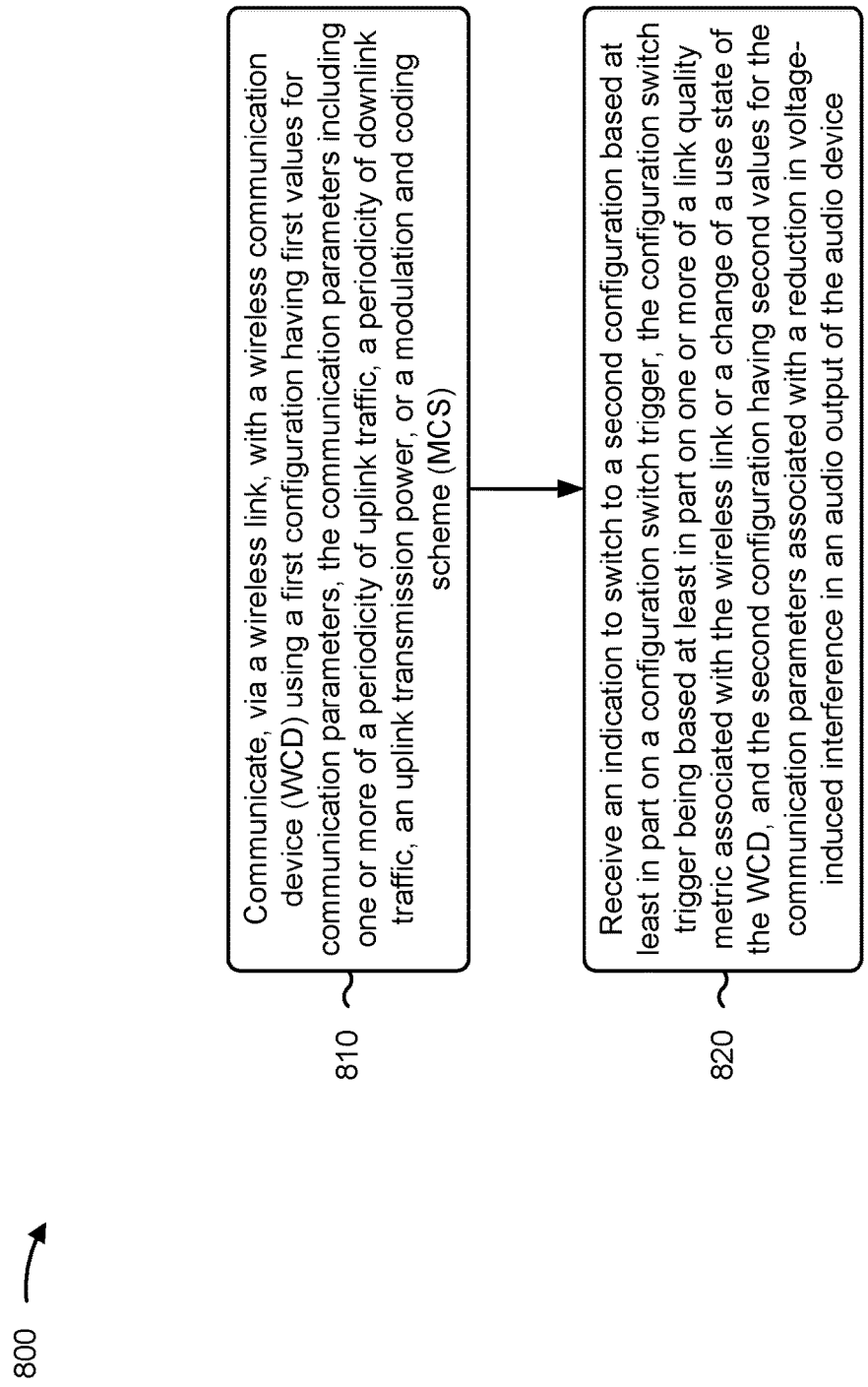
FIG. 8 is a diagram illustrating an example process performed, for example, by an audio device, in accordance with the present disclosure.

FIG. 8 is a diagram illustrating an example process 800 performed, for example, by an audio device, in accordance with the present disclosure. Example process 800 is an example where the audio device (e.g., an earbud) performs operations associated with configuration switch triggers for audio device communications.

As shown in FIG. 8, in some aspects, process 800 may include communicating, via a wireless link, with a WCD using a first configuration having first values for communication parameters, the communication parameters including one or more of: a periodicity of uplink traffic, a periodicity of downlink traffic, an uplink transmission power, or a MCS (block 810). For example, the audio device (e.g., using reception component 1002, transmission component 1004, and/or communication manager 1006, depicted in FIG. 10) may communicate, via a wireless link, with a WCD using a first configuration having first values for communication parameters, the communication parameters including one or more of: a periodicity of uplink traffic, a periodicity of downlink traffic, an uplink transmission power, or a MCS, as described above.

As further shown in FIG. 8, in some aspects, process 800 may include receiving an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters associated with a reduction in voltage-induced interference in an audio output of the audio device (block 820). For example, the audio device (e.g., using reception component 1002 and/or communication manager 1006, depicted in FIG. 10) may receive an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters associated with a reduction in voltage-induced interference in an audio output of the audio device, as described above.

Process 800 may include additional aspects, such as any single aspect or any combination of aspects described below and/or in connection with one or more other processes described elsewhere herein.

In a first aspect, the indication to switch to the second configuration comprises an indication of an index associated with the second configuration, a proper subset of the second values, or all of the second values.

In a second aspect, alone or in combination with the first aspect, at least one of the first values is different from at least one of the second values.

In a third aspect, alone or in combination with one or more of the first and second aspects, process 800 includes receiving an indication to switch from a first communication protocol to a second communication protocol based at least in part on an additional configuration switch trigger.

In a fourth aspect, alone or in combination with one or more of the first through third aspects, the additional configuration switch trigger is based at least in part on a degradation of a link quality or a change of a use state of the WCD to a relaxed latency state, and wherein the second communication protocol is associated with an increased latency or an increased range relative to the first communication protocol.

In a fifth aspect, alone or in combination with one or more of the first through fourth aspects, the link quality metric is based at least in part on one or more of a received RSSI value, a number of dropped packets, a number of retransmissions, or a packet error rate.

In a sixth aspect, alone or in combination with one or more of the first through fifth aspects, the RSSI value comprises an average of a set of most recent RSSI values.

In a seventh aspect, alone or in combination with one or more of the first through sixth aspects, the change of use state of the WCD comprises stopping of a low-latency data stream, deactivation of a screen, or exiting of an application associated with the downlink traffic or the uplink traffic.

In an eighth aspect, alone or in combination with one or more of the first through seventh aspects, the first configuration is associated with one or more of a first maximum number of uplink data retransmissions, a first maximum number of uplink ACK retransmissions, a first delayed block ACK transmission policy, a first QoS configuration, or a first configuration for transmission of traffic of an additional communication protocol that is different from a communication protocol associated with the wireless link, and wherein the second configuration is associated with one or more of a second maximum number of uplink data retransmissions that is different from the first maximum number of uplink data retransmissions, a second maximum number of uplink ACK retransmissions that is different from the first maximum number of uplink ACK retransmissions, a second delayed block ACK transmission policy that is different from the first delayed block ACK transmission policy, a second QoS configuration that is different from the first QoS configuration, or a second configuration for transmission of traffic of the additional communication protocol that is different from the first configuration for transmission of traffic of the additional communication protocol.

In a ninth aspect, alone or in combination with one or more of the first through eighth aspects, receiving the indication to switch to the second configuration comprises receiving a first message that indicates to switch to a second value for the uplink transmission power, and a second message, after the first message, to switch to one or more of a second value for the periodicity of the uplink traffic or a second value for the periodicity of the downlink traffic, or receiving a single message that indicates to switch to the second value for the uplink transmission power and to switch to one or more of the second value for the periodicity of the uplink traffic or the second value for the periodicity of the downlink traffic.

In a tenth aspect, alone or in combination with one or more of the first through ninth aspects, one or more values of the second values are based at least in part on one or more additional values of the second values, and wherein the indication to switch to the second configuration includes an indication of the one or more additional values of the second values.

In an eleventh aspect, alone or in combination with one or more of the first through tenth aspects, process 800 includes estimating a received signal strength of an uplink communication, and transmitting one or more communications having a maximum retransmission number based at least in part on the received signal strength of the uplink communication.

In a twelfth aspect, alone or in combination with one or more of the first through eleventh aspects, process 800 includes receiving an indication of a mapping of MCS values and downlink transmission powers, receiving an indication of an MCS value for a first downlink communication, receiving the first downlink communication, measuring a received signal strength of the first downlink communication, estimating a pathloss of the first downlink communication, configuring an uplink transmission power based at least in part on the pathloss of the first downlink communication, and configuring a maximum retransmission number based at least in part on the uplink transmission power.

In a thirteenth aspect, alone or in combination with one or more of the first through twelfth aspects, the indication is carried in the communication with the audio device via the wireless link.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
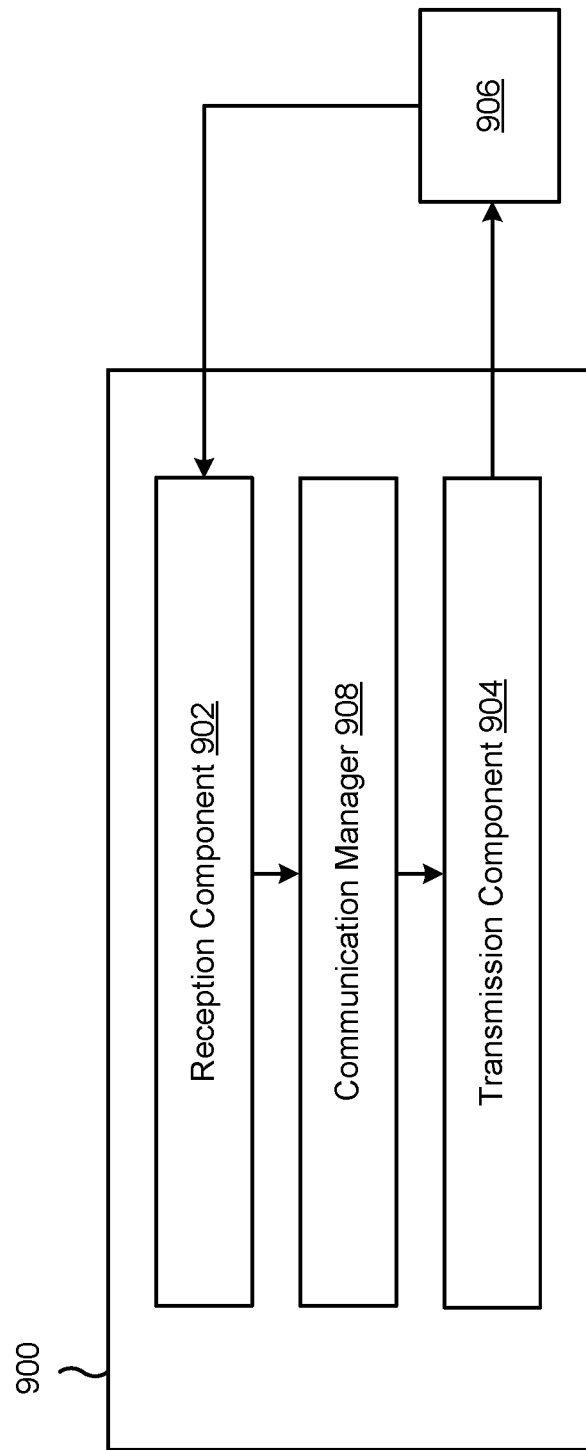
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a WCD, or a WCD may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a peripheral device, an earbud, an audio device, and/or another wireless communication device) using the reception component 902 and the transmission component 904. As further shown, the apparatus 900 may include the communication manager 908.

In some aspects, the apparatus 900 may be configured to perform one or more operations described herein. Additionally, or alternatively, the apparatus 900 may be configured to perform one or more processes described herein, such as process 300 of FIG. 3. In some aspects, the apparatus 900 and/or one or more components shown in FIG. 9 may include one or more components of the WCD described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the WCD described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the WCD described in connection with FIG. 2. In some aspects, the transmission component 904 may be co-located with the reception component 902 in a transceiver.

The communication manager 908, reception component 902, and/or transmission component 904 may communicate, via a wireless link, with an audio device using a first configuration having first values for communication parameters, the communication parameters including one or more of: a periodicity of uplink traffic, a periodicity of downlink traffic, an uplink transmission power, or an MCS. The transmission component 904 may transmit an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters.

The transmission component 904 may transmit an indication to switch from a first communication protocol to a second communication protocol based at least in part on an additional configuration switch trigger.

The transmission component 904 may transmit an indication of a received signal strength of an uplink communication.

The reception component 902 may receive one or more communications having a maximum retransmission number based at least in part on the received signal strength of the uplink communication.

The transmission component 904 may transmit an indication of a mapping of MCS values and downlink transmission powers.

The transmission component 904 may transmit an indication of an MCS value for a downlink communication.

The transmission component 904 may transmit the downlink communication.

The reception component 902 may receive an uplink communication having a maximum retransmission number that is based at least in part on the uplink transmission power.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
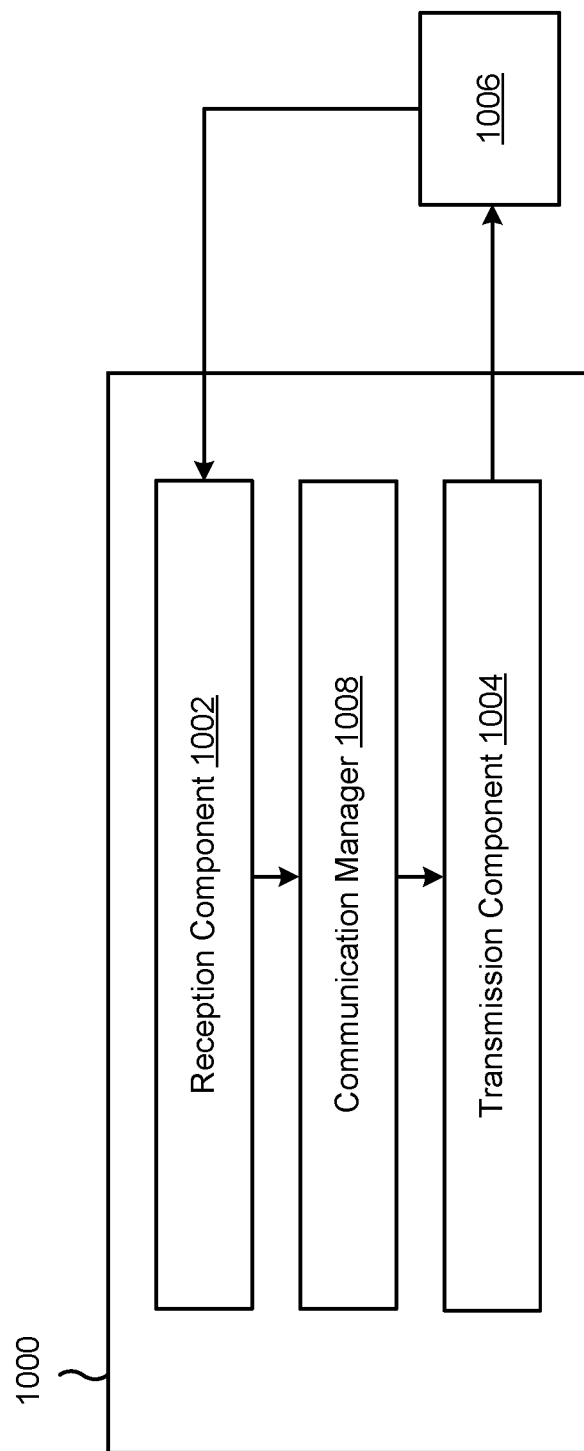
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be an audio device, or an audio device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008.

In some aspects, the apparatus 1000 may be configured to perform one or more operations described herein. Additionally, or alternatively, the apparatus 1000 may be configured to perform one or more processes described herein, such as process 400 of FIG. 4. In some aspects, the apparatus 1000 and/or one or more components shown in FIG. 10 may include one or more components of the audio device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the audio device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the audio device described in connection with FIG. 2. In some aspects, the transmission component 1004 may be co-located with the reception component 1002 in a transceiver.

The communication manager 1008, reception component 1002, and/or transmission component 1004 may communicate, via a wireless link, with a WCD using a first configuration having first values for communication parameters, the communication parameters including one or more of: a periodicity of uplink traffic, a periodicity of downlink traffic, an uplink transmission power, or an MCS. The reception component 1002 may receive an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters.

The reception component 1002 may receive an indication to switch from a first communication protocol to a second communication protocol based at least in part on an additional configuration switch trigger.

The reception component 1002 may estimate a received signal strength of an uplink communication.

The transmission component 1004 may transmit one or more communications having a maximum retransmission number based at least in part on the received signal strength of the uplink communication.

The reception component 1002 may receive an indication of a mapping of MCS values and downlink transmission powers.

The reception component 1002 may receive an indication of an MCS value for a first downlink communication.

The reception component 1002 may receive the first downlink communication.

The communication manager 1008, reception component 1002, and/or transmission component 1004 may measure a received signal strength of the first downlink communication.

The communication manager 1008 may estimate a pathloss of the first downlink communication.

The communication manager 1008 and/or the transmission component 1004 may configure an uplink transmission power based at least in part on the pathloss of the first downlink communication.

The communication manager 1008 may configure a maximum retransmission number based at least in part on the uplink transmission power.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a wireless communication device (WCD), comprising: communicating, via a wireless link, with an audio device using a first configuration having first values for communication parameters, the communication parameters including one or more of: a periodicity of uplink traffic, a periodicity of downlink traffic, an uplink transmission power, or a modulation and coding scheme (MCS); and transmitting an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters.

Aspect 2: The method of Aspect 1, wherein the indication to switch to the second configuration comprises an indication of: an index associated with the second configuration, a proper subset of the second values, or all of the second values.

Aspect 3: The method of any of Aspects 1-2, wherein at least one of the first values is different from at least one of the second values.

Aspect 4: The method of any of Aspects 1-3, further comprising: transmitting an indication to switch from a first communication protocol to a second communication protocol based at least in part on an additional configuration switch trigger.

Aspect 5: The method of Aspect 4, wherein the additional configuration switch trigger is based at least in part on a degradation of a link quality or a change of a use state of the WCD to a relaxed latency state, and wherein the second communication protocol is associated with an increased latency or an increased range relative to the first communication protocol.

Aspect 6: The method of any of Aspects 1-5, wherein the link quality metric is based at least in part on one or more of: a received signal strength indication (RSSI) value, a number of dropped packets, a number of retransmissions, or a packet error rate.

Aspect 7: The method of Aspect 6, wherein the RSSI value comprises an average of a set of most recent RSSI values.

Aspect 8: The method of any of Aspects 1-7, wherein the change of use state of the WCD comprises: stopping of a low-latency data stream, deactivation of a screen, or exiting of an application associated with the downlink traffic or the uplink traffic.

Aspect 9: The method of any of Aspects 1-8, wherein the first configuration is associated with one or more of: a first maximum number of uplink data retransmissions, a first maximum number of uplink acknowledgment (ACK) retransmissions, a first delayed block ACK transmission policy, a first quality of service (QoS) configuration, or a first configuration for transmission of traffic of an additional communication protocol that is different from a communication protocol associated with the wireless link, and wherein the second configuration is associated with one or more of: a second maximum number of uplink data retransmissions that is different from the first maximum number of uplink data retransmissions, a second maximum number of uplink ACK retransmissions that is different from the first maximum number of uplink ACK retransmissions, a second delayed block ACK transmission policy that is different from the first delayed block ACK transmission policy, a second QoS configuration that is different from the first QoS configuration, or a second configuration for transmission of traffic of the additional communication protocol that is different from the first configuration for transmission of traffic of the additional communication protocol.

Aspect 10: The method of any of Aspects 1-9, wherein transmitting the indication to switch to the second configuration comprises: transmitting: a first message that indicates to switch to a second value for the uplink transmission power, and a second message, after the first message, to switch to one or more of a second value for the periodicity of the uplink traffic or a second value for the periodicity of the downlink traffic; or transmitting a single message that indicates to switch to the second value for the uplink transmission power and to switch to one or more of the second value for the periodicity of the uplink traffic or the second value for the periodicity of the downlink traffic.

Aspect 11: The method of any of Aspects 1-10, wherein one or more values of the second values are based at least in part on one or more additional values of the second values, and wherein the indication to switch to the second configuration includes an indication of the one or more additional values of the second values.

Aspect 12: The method of any of Aspects 1-11, further comprising: transmitting an indication of a received signal strength of an uplink communication; and receiving one or more communications having a maximum retransmission number based at least in part on the received signal strength of the uplink communication.

Aspect 13: The method of any of Aspects 1-12, further comprising: transmitting an indication of a mapping of MCS values and downlink transmission powers; transmitting an indication of an MCS value for a downlink communication; transmitting the downlink communication; and receiving an uplink communication having a maximum retransmission number that is based at least in part on the uplink transmission power.

Aspect 14: A method of wireless communication performed by an audio device, comprising: communicating, via a wireless link, with a wireless communication device (WCD) using a first configuration having first values for communication parameters, the communication parameters including one or more of: a periodicity of uplink traffic, a periodicity of downlink traffic, an uplink transmission power, or a modulation and coding scheme (MCS); and receiving an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters.

Aspect 15: The method of Aspect 14, wherein the indication to switch to the second configuration comprises an indication of: an index associated with the second configuration, a proper subset of the second values, or all of the second values.

Aspect 16: The method of any of Aspects 14-15, wherein at least one of the first values is different from at least one of the second values.

Aspect 17: The method of any of Aspects 14-16, further comprising: receiving an indication to switch from a first communication protocol to a second communication protocol based at least in part on an additional configuration switch trigger.

Aspect 18: The method of Aspect 17, wherein the additional configuration switch trigger is based at least in part on a degradation of a link quality or a change of a use state of the WCD to a relaxed latency state, and wherein the second communication protocol is associated with an increased latency or an increased range relative to the first communication protocol.

Aspect 19: The method of any of Aspects 14-18, wherein the link quality metric is based at least in part on one or more of: a received signal strength indication (RSSI) value, a number of dropped packets, a number of retransmissions, or a packet error rate.

Aspect 20: The method of Aspect 19, wherein the RSSI value comprises an average of a set of most recent RSSI values.

Aspect 21: The method of any of Aspects 14-20, wherein the change of use state of the WCD comprises: stopping of a low-latency data stream, deactivation of a screen, or exiting of an application associated with the downlink traffic or the uplink traffic.

Aspect 22: The method of any of Aspects 14-21, wherein the first configuration is associated with one or more of: a first maximum number of uplink data retransmissions, a first maximum number of uplink acknowledgment (ACK) retransmissions, a first delayed block ACK transmission policy, a first quality of service (QoS) configuration, or a first configuration for transmission of traffic of an additional communication protocol that is different from a communication protocol associated with the wireless link, and wherein the second configuration is associated with one or more of: a second maximum number of uplink data retransmissions that is different from the first maximum number of uplink data retransmissions, a second maximum number of uplink ACK retransmissions that is different from the first maximum number of uplink ACK retransmissions, a second delayed block ACK transmission policy that is different from the first delayed block ACK transmission policy, a second QoS configuration that is different from the first QoS configuration, or a second configuration for transmission of traffic of the additional communication protocol that is different from the first configuration for transmission of traffic of the additional communication protocol.

Aspect 23: The method of any of Aspects 14-22, wherein receiving the indication to switch to the second configuration comprises: receiving: a first message that indicates to switch to a second value for the uplink transmission power, and a second message, after the first message, to switch to one or more of a second value for the periodicity of the uplink traffic or a second value for the periodicity of the downlink traffic; or receiving a single message that indicates to switch to the second value for the uplink transmission power and to switch to one or more of the second value for the periodicity of the uplink traffic or the second value for the periodicity of the downlink traffic.

Aspect 24: The method of any of Aspects 14-23, wherein one or more values of the second values are based at least in part on one or more additional values of the second values, and wherein the indication to switch to the second configuration includes an indication of the one or more additional values of the second values.

Aspect 25: The method of any of Aspects 14-24, further comprising: estimating a received signal strength of an uplink communication; and transmitting one or more communications having a maximum retransmission number based at least in part on the received signal strength of the uplink communication.

Aspect 26: The method of any of Aspects 14-25, further comprising: receiving an indication of a mapping of MCS values and downlink transmission powers; receiving an indication of an MCS value for a first downlink communication; receiving the first downlink communication; measuring a received signal strength of the first downlink communication; estimating a pathloss of the first downlink communication; configuring an uplink transmission power based at least in part on the pathloss of the first downlink communication; and configuring a maximum retransmission number based at least in part on the uplink transmission power.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device (WCD) for wireless communication, comprising:
   a memory; and
   one or more processors, coupled to the memory, configured to:
      communicate, via a wireless link, with an audio device using a first configuration having first values for communication parameters, the communication parameters including one or more of:
         a periodicity of uplink traffic,
         a periodicity of downlink traffic,
         an uplink transmission power, or
         a modulation and coding scheme (MCS); and
      transmit an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters.

2. The WCD of claim 1, wherein the indication to switch to the second configuration comprises an indication of:
   an index associated with the second configuration,
   a proper subset of the second values, or
   all of the second values.

3. The WCD of claim 1, wherein at least one of the first values is different from at least one of the second values.

4. The WCD of claim 1, wherein the one or more processors are further configured to:
   transmit an indication to switch from a first communication protocol to a second communication protocol based at least in part on an additional configuration switch trigger.

5. The WCD of claim 4, wherein the additional configuration switch trigger is based at least in part on a degradation of a link quality or a change of a use state of the WCD to a relaxed latency state, and
   wherein the second communication protocol is associated with an increased latency or an increased range relative to the first communication protocol.

6. The WCD of claim 1, wherein the link quality metric is based at least in part on one or more of:
   a received signal strength indication (RSSI) value,
   a number of dropped packets,
   a number of retransmissions, or
   a packet error rate.

7. The WCD of claim 6, wherein the RSSI value comprises an average of a set of most recent RSSI values.

8. The WCD of claim 1, wherein the change of use state of the WCD comprises:
   stop of a low-latency data stream,
   deactivation of a screen, or
   exiting of an application associated with the downlink traffic or the uplink traffic.

9. The WCD of claim 1, wherein the first configuration is associated with one or more of:
   a first maximum number of uplink data retransmissions,
   a first maximum number of uplink acknowledgment (ACK) retransmissions,
   a first delayed block ACK transmission policy,
   a first quality of service (QoS) configuration, or
   a first configuration for transmission of traffic of an additional communication protocol that is different from a communication protocol associated with the wireless link, and
   wherein the second configuration is associated with one or more of:

a second maximum number of uplink data retransmissions that is different from the first maximum number of uplink data retransmissions,
a second maximum number of uplink ACK retransmissions that is different from the first maximum number of uplink ACK retransmissions,
a second delayed block ACK transmission policy that is different from the first delayed block ACK transmission policy,
a second QoS configuration that is different from the first QoS configuration, or
a second configuration for transmission of traffic of the additional communication protocol that is different from the first configuration for transmission of traffic of the additional communication protocol.

10. The WCD of claim 1, wherein the one or more processors, to transmit the indication to switch to the second configuration, are configured to:
transmit:
a first message that indicates to switch to a second value for the uplink transmission power, and
a second message, after the first message, to switch to one or more of a second value for the periodicity of the uplink traffic or a second value for the periodicity of the downlink traffic; or
transmit a single message that indicates to switch to the second value for the uplink transmission power and to switch to one or more of the second value for the periodicity of the uplink traffic or the second value for the periodicity of the downlink traffic.

11. The WCD of claim 1, wherein one or more values of the second values are based at least in part on one or more additional values of the second values, and
wherein the indication to switch to the second configuration includes an indication of the one or more additional values of the second values.

12. The WCD of claim 1, wherein the one or more processors are further configured to:
transmit an indication of a received signal strength of an uplink communication; and
receive one or more communications having a maximum retransmission number based at least in part on the received signal strength of the uplink communication.

13. The WCD of claim 1, wherein the one or more processors are further configured to:
transmit an indication of a mapping of MCS values and downlink transmission powers;
transmit an indication of an MCS value for a downlink communication;
transmit the downlink communication; and
receive an uplink communication having a maximum retransmission number that is based at least in part on the uplink transmission power.

14. The WCD of claim 1, wherein the indication is carried in the communication with the audio device via the wireless link.

15. An audio device for wireless communication, comprising:
a memory; and
one or more processors, coupled to the memory, configured to:
communicate, via a wireless link, with a wireless communication device (WCD) using a first configuration having first values for communication parameters, the communication parameters including one or more of:
a periodicity of uplink traffic,
a periodicity of downlink traffic,
an uplink transmission power, or
a modulation and coding scheme (MCS); and
receive an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters.

16. The audio device of claim 15, wherein the indication to switch to the second configuration comprises an indication of:
an index associated with the second configuration,
a proper subset of the second values, or
all of the second values.

17. The audio device of claim 15, wherein at least one of the first values is different from at least one of the second values.

18. The audio device of claim 15, wherein the one or more processors are further configured to:
receive an indication to switch from a first communication protocol to a second communication protocol based at least in part on an additional configuration switch trigger.

19. The audio device of claim 18, wherein the additional configuration switch trigger is based at least in part on a degradation of a link quality or a change of a use state of the WCD to a relaxed latency state, and
wherein the second communication protocol is associated with an increased latency or an increased range relative to the first communication protocol.

20. The audio device of claim 15, wherein the link quality metric is based at least in part on one or more of:
a received signal strength indication (RSSI) value,
a number of dropped packets,
a number of retransmissions, or
a packet error rate.

21. The audio device of claim 20, wherein the RSSI value comprises an average of a set of most recent RSSI values.

22. The audio device of claim 15, wherein the change of use state of the WCD comprises:
stop of a low-latency data stream,
deactivation of a screen, or
exiting of an application associated with the downlink traffic or the uplink traffic.

23. The audio device of claim 15, wherein the first configuration is associated with one or more of:
a first maximum number of uplink data retransmissions,
a first maximum number of uplink acknowledgment (ACK) retransmissions,
a first delayed block ACK transmission policy,
a first quality of service (QoS) configuration, or
a first configuration for transmission of traffic of an additional communication protocol that is different from a communication protocol associated with the wireless link, and
wherein the second configuration is associated with one or more of:
a second maximum number of uplink data retransmissions that is different from the first maximum number of uplink data retransmissions,
a second maximum number of uplink ACK retransmissions that is different from the first maximum number of uplink ACK retransmissions, a second delayed block ACK transmission policy that is different from the first delayed block ACK transmission policy, a second QoS configuration that is different from the first QoS configuration, or a second configuration for transmission of traffic of the additional communication protocol that is different from the first configuration for transmission of traffic of the additional communication protocol.

24. The audio device of claim 15, wherein the one or more processors, to receive the indication to switch to the second configuration, are configured to:

receive:
a first message that indicates to switch to a second value for the uplink transmission power, and
a second message, after the first message, to switch to one or more of a second value for the periodicity of the uplink traffic or a second value for the periodicity of the downlink traffic; or receive a single message that indicates to switch to the second value for the uplink transmission power and to switch to one or more of the second value for the periodicity of the uplink traffic or the second value for the periodicity of the downlink traffic.

25. The audio device of claim 15, wherein one or more values of the second values are based at least in part on one or more additional values of the second values, and
wherein the indication to switch to the second configuration includes an indication of the one or more additional values of the second values.

26. The audio device of claim 15, wherein the one or more processors are further configured to:
estimate a received signal strength of an uplink communication; and
transmit one or more communications having a maximum retransmission number based at least in part on the received signal strength of the uplink communication.

27. The audio device of claim 15, wherein the one or more processors are further configured to:
receive an indication of a mapping of MCS values and downlink transmission powers;
receive an indication of an MCS value for a first downlink communication;
receive the first downlink communication;
measure a received signal strength of the first downlink communication;
estimate a pathloss of the first downlink communication;

configure an uplink transmission power based at least in part on the pathloss of the first downlink communication; and
configure a maximum retransmission number based at least in part on the uplink transmission power.

28. The audio device of claim 15, wherein the indication is carried in the communication with the audio device via the wireless link.

29. A method of wireless communication performed by a wireless communication device (WCD), comprising:
communicating, via a wireless link, with an audio device using a first configuration having first values for communication parameters, the communication parameters including one or more of:
a periodicity of uplink traffic,
a periodicity of downlink traffic,
an uplink transmission power, or
a modulation and coding scheme (MCS); and
an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters associated with a reduction in voltage-induced interference in an audio output of the audio device.

30. A method of wireless communication performed by an audio device, comprising:
communicating, via a wireless link, with a wireless communication device (WCD) using a first configuration having first values for communication parameters, the communication parameters including one or more of:
a periodicity of uplink traffic,
a periodicity of downlink traffic,
an uplink transmission power, or
a modulation and coding scheme (MCS); and
receiving an indication to switch to a second configuration based at least in part on a configuration switch trigger, the configuration switch trigger being based at least in part on one or more of a link quality metric associated with the wireless link or a change of a use state of the WCD, and the second configuration having second values for the communication parameters associated with a reduction in voltage-induced interference in an audio output of the audio device.

* * * * *